US010938639B2

(12) United States Patent
Guo et al.

(10) Patent No.: US 10,938,639 B2
(45) Date of Patent: Mar. 2, 2021

(54) ELECTRONIC DEVICE AND METHOD IN WIRELESS COMMUNICATION SYSTEM, AND WIRELESS COMMUNICATION SYSTEM

(71) Applicant: SONY CORPORATION, Tokyo (JP)

(72) Inventors: Xin Guo, Beijing (CN); Chen Sun, Beijing (CN); Wei Ren, Beijing (CN)

(73) Assignee: SONY CORPORATION, Tokyo (JP)

(*) Notice: Subject to any disclaimer, the term of this patent is extended or adjusted under 35 U.S.C. 154(b) by 6 days.

(21) Appl. No.: 16/015,356

(22) Filed: Jun. 22, 2018

(65) Prior Publication Data
US 2019/0104016 A1 Apr. 4, 2019

(30) Foreign Application Priority Data
Sep. 29, 2017 (CN) .......................... 201710912368.9

(51) Int. Cl.
| H04L 12/24 | (2006.01) |
| G08B 25/10 | (2006.01) |
| G06K 9/00 | (2006.01) |
| G08B 31/00 | (2006.01) |
| G08B 13/196 | (2006.01) |
| G06T 7/50 | (2017.01) |
| G06T 7/73 | (2017.01) |
| G06T 7/246 | (2017.01) |

(52) U.S. Cl.
CPC ........ *H04L 41/0806* (2013.01); *G06K 9/0063* (2013.01); *G08B 13/196* (2013.01); *G08B 25/10* (2013.01); *G08B 31/00* (2013.01); *G06T 7/246* (2017.01); *G06T 7/50* (2017.01); *G06T 7/73* (2017.01)

(58) Field of Classification Search
CPC ........................... H04L 41/0806; G06T 7/246
See application file for complete search history.

(56) References Cited

U.S. PATENT DOCUMENTS

| 8,854,544 | B2 * | 10/2014 | Wong | G06F 3/011 |
| | | | | 340/540 |
| 10,331,459 | B2 * | 6/2019 | Zimmermann | G06F 9/4411 |
| 10,379,801 | B1 * | 8/2019 | Waller | G06F 3/1226 |
| 10,497,246 | B2 * | 12/2019 | Arnold | A61B 5/1116 |
| 10,530,749 | B1 * | 1/2020 | Park | H04L 63/0245 |
| 2005/0009509 | A1 * | 1/2005 | Miscopein | H04W 8/245 |
| | | | | 455/418 |

(Continued)

FOREIGN PATENT DOCUMENTS

CN 105997066 A * 10/2016

*Primary Examiner* — Parth Patel
(74) *Attorney, Agent, or Firm* — Xsensus, LLP

(57) ABSTRACT

An electronic device and a method in a wireless communication system, and a wireless communication system are provided. The electronic device in a wireless communication system includes a processing circuit configured to: determine a parameter set for characterizing attributes of an acquisition object; and determine, based on the parameter set, acquisition configuration information concerning feature acquisition performed by an acquisition node on the acquisition object. With the electronic device, the method and the wireless communication system, a proper acquisition policy can be set for the acquisition object, such that feature acquisition can be properly performed on the acquisition object.

30 Claims, 8 Drawing Sheets

(56) References Cited

U.S. PATENT DOCUMENTS

| | | | |
|---|---|---|---|
| 2007/0143233 A1* | 6/2007 | Van Doren | G06N 5/003 706/14 |
| 2009/0005929 A1* | 1/2009 | Nakao | B60T 7/22 701/33.4 |
| 2012/0166405 A1* | 6/2012 | Barbian | G06F 8/65 707/694 |
| 2012/0320053 A1* | 12/2012 | Miyatani | G06T 7/75 345/420 |
| 2013/0080751 A1* | 3/2013 | Lin | G06F 8/654 713/1 |
| 2013/0289792 A1* | 10/2013 | Cheng | G05D 23/1919 700/300 |
| 2014/0156053 A1* | 6/2014 | Mahdavi | B29C 64/153 700/119 |
| 2015/0039888 A1* | 2/2015 | Barrus | H04L 9/14 713/168 |
| 2015/0160797 A1* | 6/2015 | Shearer | G06F 3/0482 715/740 |
| 2016/0173531 A1* | 6/2016 | Gupta | H04L 63/20 726/1 |
| 2017/0277530 A1* | 9/2017 | Adams | G06F 12/10 |
| 2018/0060648 A1* | 3/2018 | Yoo | G06K 9/00228 |
| 2018/0295494 A1* | 10/2018 | Meau | G06F 8/60 |
| 2019/0019047 A1* | 1/2019 | Zhou | H04M 1/72569 |
| 2019/0042773 A1* | 2/2019 | Zhang | G06F 3/1205 |
| 2019/0104016 A1* | 4/2019 | Guo | G06K 9/0063 |
| 2019/0293760 A1* | 9/2019 | Koda | G01S 7/484 |
| 2019/0294598 A1* | 9/2019 | Hsiao | G06F 16/22 |
| 2019/0318089 A1* | 10/2019 | Wang | G06F 21/566 |
| 2020/0195511 A1* | 6/2020 | Yang | H04L 41/0806 |

* cited by examiner (a)

(b)

ELECTRONIC DEVICE AND METHOD IN WIRELESS COMMUNICATION SYSTEM, AND WIRELESS COMMUNICATION SYSTEM

This application claims the benefit and priority of Chinese Application No. 201710912368.9, filed on Sep. 29, 2017, the entire disclosure of which is incorporated herein by reference.

FIELD

The embodiments of the disclosure generally relates to the technical field of wireless communication, and in particular to an electronic device in a wireless communication system, a wireless communication system, a wireless communication method performed by an electronic device in a wireless communication system, and a computer readable storage medium.

BACKGROUND

Artificial intelligence (AI) will be the core driving force of a new productivity revolution in the following decades. The artificial intelligence technology is provided to scenarios and objects with requirements in a convenient manner, by means of a great number of computing nodes in various forms and with various functions connected to a network which is accessible at any time and at any place, thereby causing revolutionary changes to people's life, work and even behavior pattern. Due to the tremendous development of machine learning, especially the deep learning technology, the accuracy and precision of data processing in the artificial intelligence technology is greatly improved.

An acquisition node acquires features of an acquisition object, and the acquired data is processed by an artificial intelligence system to obtain a required result. As can be seen, with a given algorithm, the quality of the acquired data greatly affects the processing result obtained with the artificial intelligence technology. Specifically, the number of features to be acquired, the type of features to be acquired, correlation between the features, and the accuracy of description of the features are factors which affect the processing result. In addition, the accuracy of the processing result can be improved to a certain degree by increasing the number of the features to be acquired and precision of acquisition of the features, which, however, may significantly increase the acquisition load on the acquisition system and the data processing load on the artificial intelligence system.

Therefore, it is necessary to provide a scheme where features of an acquisition object are properly acquired according to a proper acquisition policy set for the acquisition object.

SUMMARY

This part provides an overview of the present disclosure, rather than a full scope or all features of the present disclosure.

It is an object of the present disclosure to provide an electronic device in a wireless communication system, a wireless communication system, a wireless communication method performed by an electronic device in a wireless communication system, and a computer readable storage medium, with which a proper acquisition policy is set for an acquisition object, such that features of the acquisition object can be acquired properly.

According to an aspect of the present disclosure, it is provided an electronic device in a wireless communication system, which includes a processing circuit configured to: determine a parameter set for characterizing attributes of an acquisition object; and determine, based on the parameter set, acquisition configuration information concerning feature acquisition performed by an acquisition node on the acquisition object.

According to another aspect of the present disclosure, it is provided an electronic device in a wireless communication system, which includes a processing circuit configured to: acquire acquisition configuration information determined based on a parameter set for characterizing attributes of an acquisition object; and perform feature acquisition on the acquisition object based on the acquisition configuration information.

According to another aspect of the present disclosure, it is provided a wireless communication system, which includes: a control apparatus, including a processing circuit configured to: determine a parameter set for characterizing attributes of an acquisition object; and determine, based on the parameter set, acquisition configuration information concerning feature acquisition performed by an acquisition node on the acquisition object; and one or more acquisition nodes, each of which includes a processing circuit configured to: acquire the acquisition configuration information; and perform feature acquisition on the acquisition object based on the acquisition configuration information.

According to another aspect of the present disclosure, it is provided a wireless communication method performed by an electronic device in a wireless communication system, which includes: determining a parameter set for characterizing attributes of an acquisition object; and determining, based on the parameter set, acquisition configuration information concerning feature acquisition performed by an acquisition node on the acquisition object.

According to another aspect of the present disclosure, it is provided a wireless communication method performed by an electronic device in a wireless communication system, which includes: acquiring acquisition configuration information determined based on a parameter set for characterizing attributes of an acquisition object; and performing feature acquisition on the acquisition object based on the acquisition configuration information.

According to another aspect of the present disclosure, it is provided a computer readable storage medium including computer executable instructions, which cause a computer to perform the wireless communication method according to the present disclosure when executed by the computer.

With the electronic device in a wireless communication system, the wireless communication system, the wireless communication method performed by the electronic device in a wireless communication system, and the computer readable storage medium according to the present disclosure, the acquisition configuration information concerning feature acquisition performed on the acquisition object may be determined based on the parameter set of the acquisition object. In this manner, a proper acquisition policy can be set for the acquisition object, such that the acquisition node performs feature acquisition on the acquisition object based on the acquisition configuration information, thereby optimizing the acquisition process.

A further applicability range is apparent from the description provided herein. The description and specific examples in the overview are merely for the purpose of illustration and are not intended to limit the scope of the present disclosure.

BRIEF DESCRIPTION OF THE DRAWINGS

The drawings described herein are provided merely for the purpose of illustrating selected embodiments rather than all possible embodiments, and are not intended to limit the scope of the present disclosure. In the drawings.

Figure 1:
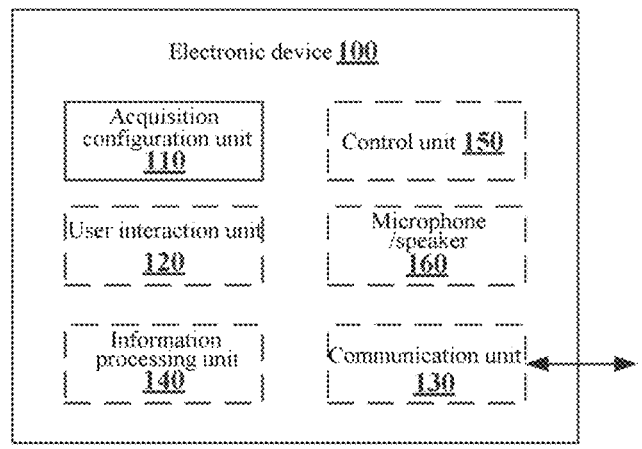
FIG. 1 is a block diagram illustrating a structure of an electronic device according to an embodiment of the present disclosure.

While specific embodiments of the present disclosure are shown as examples in the drawings and are described herein in detail, various modifications and variations may be made to the present disclosure. It should be understood that the description for the specific embodiments herein is not intended to limit the present disclosure to the disclosed specific forms, and the present disclosure is intended to encompass all modifications, equivalents and alternatives that fall within the spirit and scope of the present disclosure. It should be noted that reference numerals indicate corresponding parts throughout the drawings.

DETAILED DESCRIPTION OF THE EMBODIMENTS

Examples of the present disclosure are described more fully with reference to the drawings. The following description is merely exemplary rather than being intended to limit the present disclosure and applications or purposes of the present disclosure.

Exemplary embodiments are provided to make the present disclosure be exhaustive and fully convey the scope of the present disclosure to those skilled in the art. Various specific details such as examples of specific parts, devices and methods are set forth to provide thorough understanding for the embodiments of the present disclosure. It is apparent to those skilled in the art that the exemplary embodiments may be embodied in many different forms without the specific details, and are not interpreted as a limit for the scope of the present disclosure. In some exemplary embodiments, well-known processes, well-known structures and well-known technologies are not described in detail.

The description is made in the following order:
1. Description of the issue;
2. A configuration example on a control apparatus side;
3. A configuration example on an acquisition node side;
4. A configuration example of a wireless communication system;
5. A method embodiment;
6. Application examples; and
7. A computer device for implementing the device and the method according to the embodiments of the present disclosure

1. Description of the Issue

As mentioned above, the acquisition node acquires features of the acquisition object, and the acquired data is processed by the artificial intelligence system to obtain the required result. The acquisition object varies with the result to be acquired. For example, the acquisition object may be an animal or a plant, an antique to be categorized, a living thing to be monitored, an outdoor exercise of which a motion pattern is to be analyzed, and a road condition or environment to be monitored. In the present disclosure, the acquisition node may be a device for acquiring features of the acquisition object. Further, the acquisition node may be capable of flying and feature acquisition. In addition, the above system may include one or more acquisition nodes, where one acquisition node is used in a case of an easy acquisition task, and multiple acquisition nodes are used in combination with each other to acquire features in a case of a complicated acquisition task.

During the feature acquisition performed by the acquisition node on the acquisition object, the acquisition node acquires features of the acquisition object according to certain criteria, such as at which position the features of the acquisition object are to be acquired, which parameters of the acquisition object are to be acquired, and in which mode the acquisition is performed. As mentioned above, with a given algorithm, the quality of the acquired data greatly affects the processing result obtained with the artificial intelligence technology. Therefore, a scheme is provided according to the present disclosure, where features of an acquisition object are properly acquired according to a proper acquisition policy set for the acquisition object.

2. A Configuration Example on a Control Apparatus Side

FIG. 1 is a block diagram illustrating a structure of an electronic device 100 according to an embodiment of the present disclosure. The electronic device 100 described herein may be a control apparatus for controlling the acquisition node. The control apparatus may be independent from the acquisition node and perform wireless communication with the acquisition node. In addition, the control apparatus may be integrated in the acquisition node, such that the acquisition node has the function of the control apparatus.

As shown in FIG. 1, the electronic device 100 may include an acquisition configuration unit 110.

Here, various units of the electronic device 100 may be included in a processing circuit. It is to be noted that, the electronic device 100 may include one or more processing circuits. Further, the processing circuit may include various discrete functional units for performing various functions and/or operations. It is to be noted that, these functional units may be physical or logical entities, and units referred to differently may be implemented by a same physical entity.

According to an embodiment of the present disclosure, the acquisition configuration unit 110 may determine a parameter set for characterizing attributes of an acquisition object. Here, the parameter set may include one or more parameters for characterizing the attributes of the acquisition object, where each parameter characterizes one type of attribute.

According to an embodiment of the present disclosure, the acquisition configuration unit 110 may determine acquisition configuration information concerning feature acquisition performed by an acquisition node on the acquisition object based on the parameter set. Here, the acquisition configuration unit 110 may determine the acquisition configuration information based on one or more parameters in the parameter set. According to an embodiment of the present disclosure, the acquisition configuration information may indicate an acquisition manner in which the acquisition node performs feature acquisition on the acquisition object. The acquisition configuration information is described in detail below.

As described above, with the electronic device 100 in a wireless communication system according to the present disclosure, acquisition configuration information concerning feature acquisition performed on the acquisition object may be determined based on the parameter set of the acquisition object. In this way, a proper acquisition policy can be set for the acquisition object, such that the acquisition node performs feature acquisition on the acquisition object according to the acquisition configuration information, thereby optimizing the acquisition process.

According to an embodiment of the present disclosure, the parameter set may include one or more of: a parameter characterizing a motion state of the acquisition object; a parameter characterizing a distance between the acquisition object and the electronic device 100; a parameter characterizing a shape and a size of the acquisition object; and a parameter characterizing a category of the acquisition object. Of course, parameters included in the parameter set are not limited to the above, and the parameter set may also include other parameters characterizing attributes of the acquisition object.

According to an embodiment of the present disclosure, the parameter characterizing the motion state of the acquisition object may characterize whether the acquisition object is in a dynamic state or a stationary state. Further, the parameter characterizing the motion state of the acquisition object may also characterize a speed, a direction and the like of the motion of the acquisition object. The parameter characterizing the motion state of the acquisition object may be acquired through user input, or may be acquired by the sensing process of the electronic device 100, which may be at least one of sensing and measurement.

According to an embodiment of the present disclosure, the parameter characterizing a distance between the acquisition object and the electronic device 100 may be a value or a level of the distance. Similarly, the parameter characterizing the distance between the acquisition object and the electronic device 100 may be acquired through user input, or may be acquired by the sensing process of the electronic device 100.

According to an embodiment of the present disclosure, the parameter characterizing the shape and the size of the acquisition object may characterize an approximate shape and a size of the acquisition object. Similarly, the parameter characterizing the shape and the size of the acquisition object may be acquired through user input, or may be acquired by the sensing process of the electronic device 100.

According to an embodiment of the present disclosure, the parameter characterizing the category of the acquisition object may characterize category information of the acquisition object. Here, the category may be classification acquired based on one or more certain attributes of the acquisition object in a coarse scale or in a fine scale. For example, the acquisition object may be classified into a building category, an animal category, a plant category, an antique category, and the like. Further, each category may be further classified. For example, an antique as the acquisition object may be further classified into pottery and porcelain, jade and emerald, bronze ware, calligraphy and painting, carvings and the like. Here, the category of the acquisition object may be acquired through user input with a user interaction unit 120 in the electronic device 100. A user may input or confirm categories of the acquisition object in various manners. In addition, the category of the acquisition object may be acquired by the sensing process of the electronic device 100. For example, the electronic device 100 may recognize the category of the acquisition object by recognizing an image captured of shooting the acquisition object.

According to an embodiment of the present disclosure, the acquisition configuration unit 110 may determine the acquisition configuration information based on the above parameters. According to an embodiment of the present disclosure, the acquisition configuration information may include information of multiple aspects. Therefore, the acquisition configuration unit 110 may determine acquisition configuration information of different aspects based on different parameters.

According to an embodiment of the present disclosure, the acquisition configuration unit 110 may determine, based on the parameter set, an acquisition position at which feature acquisition is performed on the acquisition object. The acquisition configuration information includes position information of the acquisition position.

According to an embodiment of the present disclosure, the acquisition configuration information may include an actual position at which the acquisition node performs feature acquisition on the acquisition object. In addition, the acquisition configuration information may also include a candidate position at which the acquisition node performs feature acquisition on the acquisition object.

Here, the actual position is a position determined by the electronic device 100 for the acquisition node at which feature acquisition is actually performed on the acquisition object. That is, the acquisition node performs feature acquisition on the acquisition object at the actual position. The candidate position is a candidate position determined by the electronic device 100 for the acquisition node at which feature acquisition is likely to be performed on the acquisition object. That is, the acquisition node may further select from candidate positions to determine the actual position at which feature acquisition is performed on the acquisition object. Each of the actual position and the candidate position may include one or more positions. That is, the acquisition configuration unit 110 may determine one or more acquisition positions at which feature acquisition is performed on the acquisition object based on the parameter set, and include position information of the one or more acquisition positions in the acquisition configuration information.

According to an embodiment of the present disclosure, the position information of the acquisition position may indicate an envelope shape of the acquisition position. The envelope shape may be a set of multiple acquisition positions, and is a line or a plane consisting of the multiple acquisition positions. In addition, the envelope shape may be a regular shape or an irregular shape. Here, the acquisition position may be the candidate position. That is, the acquisition configuration information may include an envelope shape of candidate positions.

Figure 2:
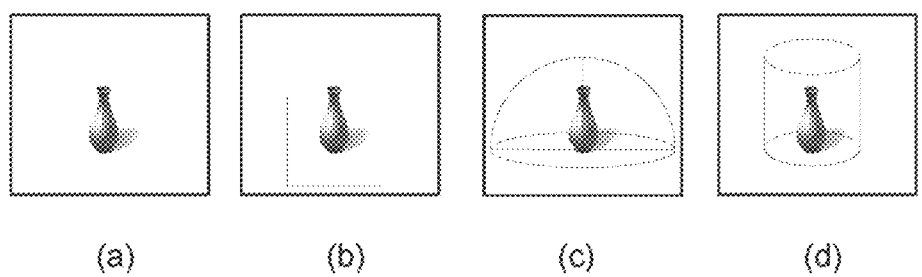
FIG. 2 is a schematic diagram illustrating several exemplary envelope shapes according to an embodiment of the present disclosure.

FIG. 2 is a schematic diagram illustrating several exemplary envelope shapes according to an embodiment of the present disclosure. In FIG. 2, the acquisition object is an antique vase. As shown in FIG. 2(*a*), the envelope shape is a line segment. As shown in FIG. 2(*b*), the envelope shape is a plane with a boundary. As shown in FIG. 2(*c*), the envelope shape is a hemispherical surface. As shown in FIG. 2(*d*), the envelope shape is a surface of a cylinder. Here, only several examples of the regular envelope shape are shown in FIG. 2 for ease of description. Of course, the envelope shape of the candidate acquisition positions may be other exemplary regular shapes or irregular shapes.

According to an embodiment of the present disclosure, the acquisition configuration unit 110 may determine the envelope shape of the acquisition position at which feature acquisition is performed on the acquisition object based on the parameter set. For example, the acquisition configuration unit 110 may determine the envelope shape of the acquisition position based on the following parameter in the parameter set: a parameter characterizing a shape of the acquisition object. That is, the acquisition configuration unit 110 may automatically determine the envelope shape best matching the acquisition object based on the shape of the acquisition object. For example, the envelope shape shown in FIG. 2(*b*) may be determined in a case where the acquisition object has a planar shape, the envelope shapes shown in FIGS. 2(*c*) and 2(*d*) may be determined in a case where the acquisition object has a three-dimensional shape, and the envelope shape shown in FIG. 2(*a*) may be determined in a case where the acquisition object has an inner structure.

According to an embodiment of the present disclosure, the envelope shape of the acquisition position at which feature acquisition is performed on the acquisition object may also be determined according to user input. Here, the user interaction unit 120 of the electronic device 100 may be used for receiving user input. That is, the electronic device 100 may provide the user with options of multiple envelope shapes, from which the user selects a suitable envelope shape.

According to an embodiment of the present disclosure, the envelope shape may be a liner shape or a planer shape consisting of acquisition positions. That is, the envelope shape may indicate position relation among multiple acquisition positions. The electronic device 100 may include the position information of the acquisition positions indicating the envelope shape of the acquisition positions in the acquisition configuration information, such that the acquisition node can determine position coordinates of the acquisition positions. In this case, the acquisition configuration information includes only the envelope shape, and the acquisition position determined based on the envelope shape may be used as the candidate position.

According to an embodiment of the present disclosure, the position information of the acquisition position may also indicate a position coordinate of the acquisition position. If there are multiple acquisition positions, the acquisition configuration unit 110 may determine the position coordinate of each of the multiple acquisition positions. Here, the position coordinate indicates a position coordinate of the acquisition position in a coordinate system where the acquisition object is located. The acquisition position may be the actual position or the candidate position. That is, the acquisition configuration information may include the position coordinate of the actual position, and may include the position coordinate of the candidate position.

According to an embodiment of the present disclosure, the acquisition configuration unit 110 may determine the position coordinate of the acquisition position based on the envelope shape of the acquisition position and position information of one or more reference points.

According to an embodiment of the present disclosure, each envelope shape may include one or more reference points. The reference points indicate points which determine a size and a shape of the envelope shape. Generally, the size and the shape of one envelope shape may be determined based on two reference points. The position information of the reference point indicates a position coordinate of the reference point, which is a position coordinate of the reference point in a coordinate system where the acquisition object is located. As mentioned above, the envelope shape is a liner shape or a planer shape where acquisition positions are located. According to an embodiment of the present disclosure, the acquisition configuration unit 110 may determine a position of the envelope shape in the coordinate system where the acquisition object is located based on the envelope shape and position coordinates of the one or more reference points on the envelope shape in the coordinate system, thereby determining the position of the acquisition position in the coordinate system.

Figure 3:
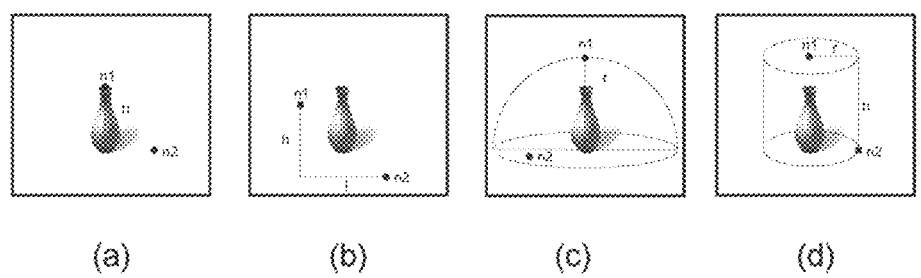
FIG. 3 is a schematic diagram illustrating several exemplary reference points according to an embodiment of the present disclosure.

FIG. 3 is a schematic diagram illustrating several exemplary reference points according to an embodiment of the present disclosure. As shown in FIG. 3(*a*), for an envelope shape which is a straight-line segment, a reference point n1 indicates one endpoint of the straight-line segment, and a reference point n2 indicates a point on a plane where a bottom of the acquisition object is located. Therefore, the straight-line segment which takes the reference point n1 as one endpoint, has a length h which is a difference between a height of the reference point n1 and a height of the reference point n2, and is perpendicular to the plane where the bottom of the acquisition object is located, is the envelope shape determined based on the reference points n1 and n2. As shown in FIG. 3(b), a reference point n1 is a vertex of a planar rectangular, a reference point n2 is an intersection point of a plane where a bottom of the acquisition object is located and the planar rectangular, and is also another vertex of the planar rectangular. Therefore, a plane (which has a height h and a length 1) determined by taking the reference points n1 and n2 as two vertex of the planar rectangular which are diagonally opposite to each other is the envelope shape determined based on the reference points n1 and n2. As shown in FIG. 3(c), a reference point n1 is a vertex of a hemisphere, and a reference point n2 is at any position on a plane where a bottom of the acquisition object is located. Therefore, the hemisphere determined by taking the reference node n1 as the vertex and a difference r between a height of the reference point n1 and a height of the reference point n2 as a radius is the envelope shape determined based on the reference points n1 and n2. As shown in FIG. 3(d), a reference point n1 is a center of an upper surface of a cylinder, and a reference point n2 is an intersection point of a plane where a bottom of the acquisition object is located and a side surface of the cylinder. Therefore, the cylindrical surface determined by taking n1 as a center of the upper surface of the cylinder, a difference h between a height of the reference point n1 and a height of the reference point n2 as a height of the cylinder, and a distance r between a point formed by mapping the reference point n1 to the plane where the bottom of the acquisition object is located and the reference point n2 as a radius is the envelope shape determined based on the reference points n1 and n2. As described above, in FIG. 3, the reference points are described by taking the envelope shapes shown in FIG. 2 as examples. As can be seen, the reference points are points which are on the envelope shape and with which the size and the shape of the envelope shape can be determined.

Figure 4:
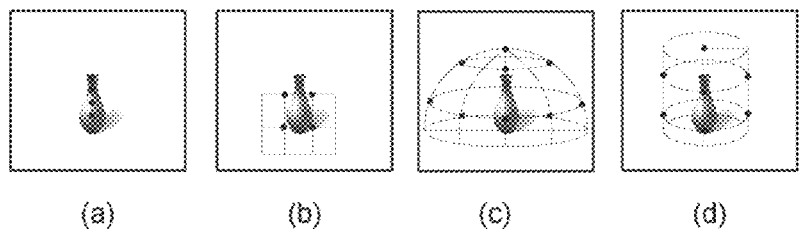
FIG. 4 is a schematic diagram illustrating determination of a candidate acquisition position based on the envelope shape according to an embodiment of the present disclosure.

FIG. 4 is a schematic diagram illustrating determination of the candidate acquisition position based on the envelope shape according to an embodiment of the present disclosure. According to an embodiment of the present disclosure, after determining the position of the envelope shape in the coordinate system, the acquisition configuration unit 110 may determine multiple acquisition positions on the envelope shape according to actual requirements. The acquisition position is determined according to the following principle: the acquisition node accurately performs a feature acquisition task on the acquisition object at minimum number of positions, with the minimum movement and minimum reconfiguration, where no feature is omitted. As shown in FIG. 4, a black solid dot indicates an acquisition position. As shown in FIG. 4(a), for the envelope shape which is a straight-line segment, a certain number of acquisition positions at a certain interval on the straight-line segment may be selected as the acquisition positions. As shown in FIG. 4(b), for the envelope shape which is a plane with a boundary, the plane may be partitioned into several grids, and vertexes of the grids are selected as the acquisition positions. As shown in FIG. 4(c), for the envelope shape which is a hemisphere surface, the hemisphere surface is divided by multiple latitude lines and longitude lines, and intersection points of the latitude lines and the longitude lines are selected as the acquisition positions. As shown in FIG. 4(d), for the envelope shape which is a surface of a cylinder, acquisition positions can be determined in a similar manner. As described above, manners in which the acquisition position is determined based on the envelope shape are described as examples. Of course, the present disclosure is not limited thereto, and the acquisition position may be determined in other manners.

As described above, upon determining the position of the envelope shape in the coordinate system based on the reference points and determining multiple acquisition positions based on the envelope shape, the acquisition configuration unit 110 can determine positions of the multiple acquisition positions in the coordinate system. Next, the acquisition configuration unit 110 may include the position information of the multiple acquisition positions in the acquisition configuration information. In this case, since coordinates of the acquisition positions are determined, the acquisition positions may be included in the acquisition configuration information for serving as the coordinate positions, or the acquisition positions may be included in the acquisition configuration information for serving as actual positions.

According to an embodiment of the present disclosure, the interaction unit 120 may be used for receiving user input, specifically, for receiving positions of one or more reference points inputted by a user in a case where the acquisition object has a small size, and the envelope shape and a position relation with respect to the acquisition object can be generally recognized by the user. Of course, the positions of the one or more reference points can also be automatically determined by the electronic device 100.

According to an embodiment of the present disclosure, the acquisition configuration unit 110 may determine the acquisition position based on feature acquisition capability of the acquisition node, a use condition of the acquisition node and characteristics of the acquisition object.

For example, the feature acquisition capability of the acquisition node may include: a condition on which the acquisition node can operate normally; a spatial range, temperature, humidity, atmospheric pressure, gas density, smoke density, air velocity, electromagnetic radiation intensity, radiation intensity and the like when the acquisition node performs feature acquisition; limitations on the shooting angle and the shooting distance of the acquisition node; limitations on the distance and the accuracy of infrared detection, radar ranging and positioning and the like performed by the acquisition node.

For example, the use condition of the acquisition node may include: a function which must be used/limited/forbidden during normal operation of the acquisition node due to the influence caused by the acquisition node to people or other devices around the acquisition node; a space/time period in which the acquisition node is forbidden from flying (for example, the no-fly zone or schedule of aviation flight); a function or a list of functions which must be turned off (such as image shooting and recording as well as sound playing/recording) during flight over a certain area; a function or a list of functions which must be turned on (such as light/sound for indication and a radar collision avoidance system) during flight over a certain area; configuration for communication over a certain area (such as available/unavailable spectrum, the maximum power of a used spectrum, signal intensity measurement, and reference values).

For example, the characteristics of the acquisition object may include: an effective distance to be kept between the acquisition node and the acquisition object for a fragile acquisition object, a limited signal transmission range of a sensor carried by the acquisition object from which data is to be read, and the like.

Only some examples of the feature acquisition capability of the acquisition node, the use condition of the acquisition node, and characteristics of the acquisition object are described above, and the present disclosure is not limited thereto. The acquisition configuration unit 110 may also determine the acquisition position according to other constraints.

According to an embodiment of the present disclosure, when determining the acquisition position, the acquisition configuration unit 110 may jointly consider value ranges of the above constraints, determine acquisition positions which meet all of the above constraints, and include position information of these acquisition positions in the acquisition configuration information. Alternatively, the acquisition configuration unit 110 may include the value ranges of the above constraints in the acquisition configuration information, such that the acquisition node determines the acquisition position based on the value ranges of the constraints.

According to an embodiment of the present disclosure, the acquisition configuration unit 110 may determine the acquisition position based on the envelope shape by considering the above factors. For example, the acquisition configuration unit 110 may select an acquisition position on the envelope shape which meets the constraints as the candidate acquisition position or the actual acquisition position.

As described above, the acquisition configuration information may include the position information of the acquisition position, where each acquisition position may be a point (for example, one acquisition position is expressed by a coordinate value) or a range (for example, one acquisition position is expressed by a coordinate range). That is, each acquisition position may be a range of the position at which the acquisition node performs feature acquisition on the acquisition object.

According to an embodiment of the present disclosure, the acquisition configuration information may also include acquisition mode information concerning feature acquisition performed on the acquisition object. The acquisition mode information is used for indicating a mode in which feature acquisition is performed on the acquisition object.

The acquisition mode information may include one or more of: hover shooting, rotating shooting, vibrating shooting between multiple acquisition positions at a predetermined frequency (that is, reciprocating shooting), and a motion correlation relative to the acquisition object. Of course, the above acquisition modes are only examples, and other acquisition modes can also be adopted.

According to an embodiment of the present disclosure, the acquisition configuration unit 110 may determine the acquisition mode based on a parameter set, and include the acquisition mode information in the acquisition configuration information. Specifically, the acquisition configuration unit 110 may determine the acquisition mode based on one or more of the following parameters in the parameter set: a parameter characterizing a motion state of the acquisition object, and a parameter characterizing a category of the acquisition object.

For example, in a case where the motion state of the acquisition object is a stationary state, and images are to be captured at a fixed angle, the acquisition mode of the hover shooting is adopted where the acquisition node hovers at the candidate acquisition position and performs fixed shooting. In a case where the motion state of the acquisition object is a stationary state, and images are to be captured at multiple angles, the acquisition mode of the rotation shooting is adopted, that is, the acquisition node rotates around the acquisition object and performs shooting at multiple angles. In a case where the motion state of the acquisition object is a dynamic state, and the acquisition node needs to perform tracking shooting, an acquisition mode where the acquisition node is maintained stationary relative to a certain portion of the acquisition object is adopted. In addition, the acquisition node may also adopt the acquisition mode where the acquisition node vibrates among multiple acquisition positions and at a predetermined frequency and performs shooting.

According to an embodiment of the present disclosure, the acquisition configuration information may also include an acquisition parameter concerning feature acquisition performed on the acquisition object. Here, the acquisition parameter indicates which parameter of the acquisition object is to be acquired.

For example, the acquisition parameter may include one or more of: image, voice, depth, temperature, humidity, gas density, air velocity, radiation intensity, smell, pressure and smog. Of course, these parameters are only example, and other types of acquisition parameters may also be included.

According to an embodiment of the present disclosure, the acquisition configuration unit 110 may determine the acquisition parameter based on the parameter set. For example, the acquisition configuration unit 110 may determine the acquisition parameter based on one or more of: a parameter characterizing a motion state of the acquisition object; a parameter characterizing a position relation (such as a distance) between the acquisition object and the electronic device; and a parameter characterizing a category of the acquisition object.

According to an embodiment of the present disclosure, the acquisition configuration information may also include other configuration concerning feature acquisition performed on the acquisition object, which is referred to as basic configuration in the present disclosure.

For example, the basic configuration may include one or more of: whether automatic focusing is enabled when an image is captured, a direction of the camera when an image is captured, whether an infrared sensor is enabled, system settings and functional settings of the infrared sensor (such as infrared thermal imaging, search or tracking, and infrared ranging). These basic configurations may be associated with the candidate acquisition position. For example, the camera is directed to different directions when images are captured at different candidate acquisition positions. The acquisition configuration unit 110 may configure the above basic functions of the acquisition node and include basic configuration information in the acquisition configuration information.

According to an embodiment of the present disclosure, the electronic device 100 may further include a communication unit 130 for communicating with the acquisition node. For example, the communication unit 130 may transmit the acquisition configuration information to the one or more acquisition nodes, and receive acquisition results of feature acquisition performed on the acquisition object from the one or more acquisition nodes.

Here, the acquisition configuration unit 110 of the electronic device 100 may determine, for each of the one or more acquisition nodes, the acquisition configuration information for the acquisition node, and transmit, to each of the one or more acquisition nodes, the acquisition configuration information for the acquisition node. Here, if there is only one acquisition node, the acquisition configuration information transmitted by the electronic device 100 to the acquisition node may also include an acquisition order of multiple candidate acquisition positions, such that the acquisition node successively performs feature acquisition at the multiple candidate acquisition positions in the order. This order is configured by the acquisition configuration unit 110 to ensure that the acquisition node is capable of performing a certain feature acquisition task in the minimum time period, with the minimum movement or minimum reconfiguration. In addition, if there are multiple acquisition nodes, the acquisition configuration unit 110 may transmit, to each of the multiple acquisition nodes, the acquisition configuration information for the acquisition node, such that the multiple acquisition nodes cooperate to perform a certain feature acquisition task. Similarly, it is to be ensured that a certain feature acquisition task is performed by the acquisition nodes in the minimum time period, with the minimum movement and minimum reconfiguration, or performed by the minimum number of acquisition nodes.

According to an embodiment of the present disclosure, the electronic device 100 may further include an information processing unit 140 for processing acquisition results of the one or more acquisition nodes, to output a final output result.

According to an embodiment of the present disclosure, the acquisition configuration unit 110 may determine a feature sequence concerning feature acquisition performed on the acquisition object based on the parameter set. In addition, the information processing unit 140 may process the acquisition result based on the feature sequence.

Here, the feature sequence may include at least one of a time sequence of one or more acquired features and an attribute sequence of one or more acquired features. That is, the feature sequence indicates a sequence of features to be extracted by the electronic device 100 from the acquisition result. Different attributes of the acquisition object may characterize different features. The sequence consisting of these attributes is referred to as the feature sequence. Alternatively, variations of a same attribute of the acquisition object at different time instants may characterize a same feature. The sequence consisting of the variations of the attribute at different time instants is referred to as the time sequence.

According to an embodiment of the present disclosure, the acquisition configuration unit 110 may determine the feature sequence concerning feature acquisition performed on the acquisition object based on, for example, the following parameters in the parameter set: a parameter characterizing a motion state of the acquisition object, and a parameter characterizing a category of the acquisition object. Examples of the feature sequence for several difference acquisition objects are described below.

For example, in a case where the acquisition object is an antique to be classified, the attribute sequence may include one or more of: image contour, decorative pattern, material and texture, shape, ornamentation, body and glaze, and inscriptions. The attribute sequence may also include a sequence of one or more features at different positions, for example, ornamentation at different positions.

For example, in a case where the acquisition object is a dynamic object of which a motion behavior is to be recorded, the attribute sequence may include one or more of: an image of the acquisition object, a gesture of the acquisition object, vital sign data of the acquisition object, and operation data of sports equipment used by the acquisition object. The time sequence may be, for example, a change in the gesture of the acquisition object over time, a change in the vital sign data of the acquisition object over time, and the like.

For example, in a case where the acquisition object is an environmental factor or event on a predetermined route, the attribute sequence may include one or more of: an image, temperature, humidity, air pressure, gas concentration, air velocity and a sea area in a certain area on the predetermined route. The time sequence may be, for example, a change in the temperature in a certain area on the predetermined route over time, a change in the air velocity in a certain area on the predetermined route over time, and the like.

The above description of the feature sequence is only exemplary. The feature sequence may include other content depending on the acquisition object.

According to an embodiment of the present disclosure, when processing the acquisition result, the information processing unit 140 may use a machine learning model such as the Neural Network (NN), which may include the Convolutional Neural Network (CNN) and the Recurrent Neural Network (RNN), and may use a the Generative Adversarial Network (GAN), the Bayes Classifier, and the like. In addition, a supervised learning model and an unsupervised learning model may also be used for different acquisition objects.

According to an embodiment of the present disclosure, the machine learning model may be trained using any method known in the art, such that the acquired data can be accurately processed with the model. In addition, different types of final results can be outputted depending on the acquisition object. For example, in a case where the acquisition object is a stationary object to be classified, the outputted final result may be the type of the acquisition object. The type may be based on classification in any scale.

In the above, the acquisition configuration unit 110, the user interaction unit 120, the communication unit 130 and the information processing unit 140 of the electronic device 100 are described. The acquisition configuration unit 110 may determine that the acquisition configuration information includes one or more of: the position information of the candidate acquisition position, the acquisition mode information, the acquisition parameter information, the basic configuration information and the feature sequence. The user interaction unit 120 may receive user input. The communication unit 130 may perform communication between the electronic device 100 and the acquisition node. The information processing unit 140 may process the acquisition result of the acquisition node.

In addition, the electronic device 100 may further include a control unit 150 for controlling other units of the electronic device 100 in a centralized manner.

Further, the electronic device 100 may include a microphone/speaker 160, for implementing voice interaction with the acquisition object.

The electronic device 100 according to the embodiment of the present disclosure is described above in detail. With the electronic device 100 in a wireless communication system according to the present disclosure, the acquisition configuration information concerning feature acquisition performed on the acquisition object may be determined based on the parameter set of the acquisition object. In this manner, a proper acquisition policy can be set for the acquisition object, such that the acquisition node performs feature acquisition on the acquisition object based on the acquisition configuration information, thereby optimizing the acquisition process.

3. A Configuration Example on the Acquisition Node Side

Figure 5:
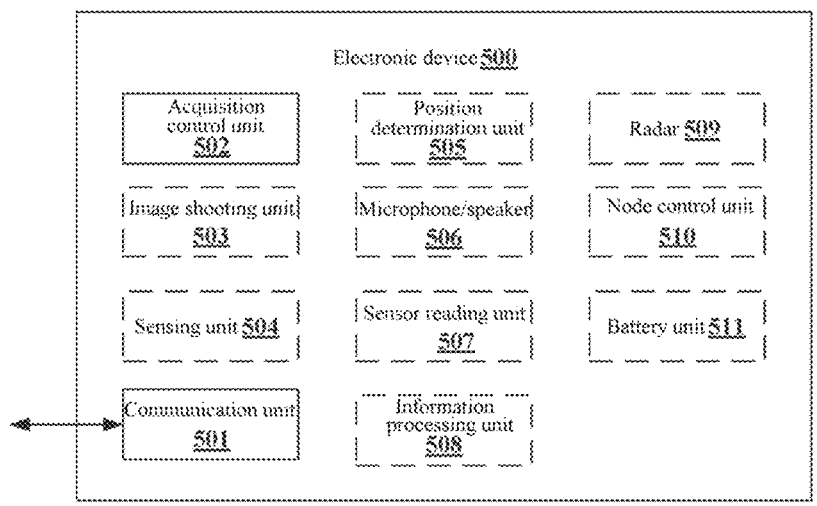
FIG. 5 is a block diagram illustrating a structure of an electronic device according to another embodiment of the present disclosure.

FIG. 5 is a block diagram illustrating a structure of an electronic device 500 according to an embodiment of the present disclosure. Here, the electronic device 500 is the acquisition node which performs feature acquisition on the acquisition object. That is, the electronic device 100 described above controls the electronic device 500.

According to an embodiment of the present disclosure, the electronic device 500 may be a device capable of flying and shooting, such as a smart drone with a shooting function or a smart dust with a flying function.

As shown in FIG. 5, the electronic device 500 may include a communication unit 501 and an acquisition control unit 502

Here, various units of the electronic device 500 may be included in a processing circuit. It is to be noted that, the electronic device 500 may include one or more processing circuits. Further, the processing circuit may include various discrete functional units for performing various functions and/or operations. It is to be noted that, these functional units may be physical or logical entities, and units referred to differently may be implemented by a same physical entity.

According to an embodiment of the present disclosure, the communication unit 501 may acquire acquisition configuration information determined based on a parameter set for characterizing attributes of an acquisition object. Here, the communication unit 501 may acquire the acquisition configuration information from a control apparatus controlling the electronic device 500, such as the electronic device 100.

According to an embodiment of the present disclosure, the acquisition control unit 502 may perform feature acquisition on the acquisition object based on the acquisition configuration information.

According to an embodiment of the present disclosure, the acquisition configuration information may be determined based on the parameter set for characterizing attributes of the acquisition object. Therefore, with the electronic device 500 in a wireless communication system according to the present disclosure, feature acquisition may be performed on the acquisition object based on the acquisition configuration information. In this manner, a proper acquisition policy can be set for the acquisition object, thereby optimizing the acquisition process.

According to an embodiment of the present disclosure, the acquisition configuration information may include position information of multiple acquisition positions at which feature acquisition is performed on the acquisition object, and the acquisition control unit 502 may control the electronic device 500 to perform feature acquisition on the acquisition object at the multiple acquisition positions.

According to an embodiment of the present disclosure, the position information of the acquisition position may include position coordinates of the multiple acquisition positions. In this case, the acquisition control unit 502 may control the electronic device 500 to perform feature acquisition on the acquisition object at the multiple acquisition positions. In addition, the acquisition control unit 502 may also select from the multiple acquisition positions to determine multiple actual positions at which the acquisition node performs feature acquisition on the acquisition object. The principle for selecting is described in detail below.

According to an embodiment of the present disclosure, the position information of the acquisition position may include the envelope shape of the acquisition position.

According to an embodiment of the present disclosure, the acquisition control unit 502 may determine the position coordinates of the multiple actual positions at which the acquisition node performs feature acquisition on the acquisition object based on the envelope shape of the acquisition positions and position information of one or more reference points.

As described above, each envelope shape may include one or more reference points. The reference points indicate points which determine a size and a shape of the envelope shape. The acquisition control unit 502 may determine the position coordinate of the acquisition position based on the envelope shape and position information of one or more reference points, in a manner similar to that of the acquisition configuration unit 110 in the electronic device 100 determining the position coordinate of the acquisition position. Similarly, the acquisition position is determined according to the following principle: the acquisition node accurately performs a feature acquisition task on the acquisition object at minimum number of positions, with the minimum movement and minimum reconfiguration, where no feature is omitted.

According to an embodiment of the present disclosure, the electronic device 500 may include a sensing unit 504, which may include one or more depth sensors such as an infrared sensor for implementing functions such as infrared ranging. Therefore, the electronic device 500 may determines position coordinates of the one or more reference points, thereby determining the position coordinates of the actual positions.

As described above, on determining the position of the envelope shape in the coordinate system based on the reference points and determining multiple acquisition positions based on the envelope shape, the acquisition control unit 502 may determine positions of the multiple acquisition positions in the coordinate system, i.e., the position coordinates of the multiple actual positions. Therefore, the acquisition control unit 502 can control the electronic device 500 to perform feature acquisition on the acquisition object at the multiple actual positions.

According to an embodiment of the present disclosure, each of the acquisition positions represents a position range in which the acquisition node performs feature acquisition on the acquisition object, and the acquisition control unit 502 can control the electronic device 500 to perform feature acquisition on the acquisition object within the position ranges corresponding to the multiple acquisition positions.

Here, in a case where each acquisition position is a position point, the acquisition control unit 502 may control the electronic device 500 to perform feature acquisition on the acquisition object at each acquisition position. In a case where each acquisition position is a position range, the acquisition control unit 502 may control the electronic device 500 to perform feature acquisition on the acquisition object within the position range.

According to an embodiment of the present disclosure, the acquisition control unit 502 may perform selection and adjustment on the acquisition positions included in the acquisition configuration information according to actual conditions, thereby determining actual acquisition positions at which acquisition is performed. That is, in a case where the acquisition configuration information includes the position coordinates of the candidate positions, the acquisition control unit 502 may determine the position information of the actual position based on the position coordinates of the candidate positions. In a case where the acquisition configuration information includes the envelope shape of the candidate positions, the acquisition control unit 502 may determine the position information of the actual position based on the envelope shape of the candidate positions and the position information of the one or more reference points.

Specifically, the acquisition control unit 502 may determine multiple actual positions based on feature acquisition capability of the acquisition node, a use condition of the acquisition node and characteristics of the acquisition object.

For example, the feature acquisition capability of the acquisition node may include: a condition on which the acquisition node can operate normally; a spatial range, temperature, humidity, atmospheric pressure, gas density, smoke density, air velocity, electromagnetic radiation intensity, radiation intensity and the like when the acquisition node performs feature acquisition; limitations on the shooting angle and the shooting distance of the acquisition node; limitations on the distance and the accuracy of infrared detection, radar ranging and positioning and the like performed by the acquisition node.

For example, the use condition of the acquisition node may include: a function which must be used/limited/forbidden during normal operation of the acquisition node due to the influence caused by the acquisition node to people or other devices around the acquisition node; a space/time period in which the acquisition node is forbidden from flying (for example, the no-fly zone or schedule of aviation flight); a function or a list of functions which must be turned off (such as image shooting and recording as well as sound playing/recording) during flight over a certain area; a function or a list of functions which must be turned on (such as light/sound for indication and a radar collision avoidance system) during flight over a certain area; configuration for communication over a certain area (such as available/unavailable spectrum, the maximum power of a used spectrum, signal intensity measurement, and reference values).

For example, the characteristics of the acquisition object may include: an effective distance to be kept between the acquisition node and the acquisition object for a fragile acquisition object, a limited signal transmission range of a sensor carried by the acquisition object from which data is to be read, and the like.

Only some examples of the feature acquisition capability of the acquisition node, the use condition of the acquisition node, and characteristics of the acquisition object are described above, and the present disclosure is not limited thereto. The acquisition control unit 502 may also determine the actual position according to other constraints.

According to an embodiment of the present disclosure, when determining the position coordinate of the actual position based on the position coordinates of the candidate positions, the acquisition control unit 502 may jointly consider value ranges of the above constraints, thereby determining the actual position which meets all of the constraints.

According to an embodiment of the present disclosure, the acquisition control unit 502 may determine the actual position based on the envelope shape by considering the above factors. For example, the acquisition control unit 502 may select an acquisition position on the envelope shape which meets all of the constraints as the actual position.

According to an embodiment of the present disclosure, the acquisition configuration information may also include acquisition mode information concerning feature acquisition performed on the acquisition object, and the acquisition control unit 502 may control the electronic device 500 to perform feature acquisition on the acquisition object in an acquisition mode included in the acquisition mode information.

For example, the acquisition mode information may include one or more of: hover shooting, rotating shooting, vibrating shooting between multiple acquisition positions at a predetermined frequency, and a motion correlation relative to the acquisition object. Of course, the present disclosure is not limited to the above acquisition modes.

According to an embodiment of the present disclosure, in a case where the acquisition mode information indicates that the acquisition mode is the hover shooting, the acquisition control unit 502 may control the electronic device 500 to hover at the candidate acquisition position or the actual acquisition position and perform fixed shooting. In a case where the acquisition mode information indicates that the acquisition mode is the rotating shooting, the acquisition control unit 502 may control the electronic device 500 to rotate around the acquisition object and perform shooting at multiple angles. In a case where the acquisition mode information indicates that the acquisition mode is an acquisition mode where the acquisition node is maintained stationary relative to a certain portion of the acquisition object, the acquisition control unit 502 may control the electronic device 500 to maintain stationary relative to a certain portion of the acquisition object and perform feature acquisition. In a case where the acquisition mode information indicates the acquisition mode is the vibrating shooting between multiple acquisition positions at a predetermined frequency, the acquisition control unit 502 may control the electronic device 500 to vibrate between multiple acquisition positions at a predetermined frequency and perform shooting (that is, reciprocating shooting).

According to an embodiment of the present disclosure, the acquisition configuration information may include an acquisition parameter of feature acquisition performed on the acquisition object, and the acquisition control unit 502 may control the electronic device 500 to perform feature acquisition on the acquisition parameter of the acquisition object.

For example, the acquisition parameter may include one or more of: image, voice, depth, temperature, humidity, gas density, air velocity, radiation intensity, smell, pressure and smog.

As shown in FIG. 5, the electronic device 500 may include an image shooting unit 503, a sensing unit 504 and a microphone/speaker 506. According to an embodiment of the present disclosure, the electronic device 500 may acquire an image of the acquisition object using the image shooting unit 503 in a case where the acquisition parameter includes the image, the electronic device 500 may acquire voice of the acquisition object using the microphone/speaker 506 in a case where the acquisition parameter includes the voice, the electronic device 500 may acquire a depth of the acquisition object using an infrared sensor in the sensing unit 504 in a case where the acquisition parameter includes the depth, the electronic device 500 may acquire temperature, humidity, gas density, air velocity, radiation intensity, smell, pressure and smog of the acquisition object using corresponding sensors (such as a temperature sensor, a humidity sensor, a pressure sensor) in the sensing unit 504 in a case where the acquisition parameter includes the temperature, the humidity, the gas density, the air velocity, the radiation intensity, the smell, the pressure and the smog.

According to an embodiment of the present disclosure, the electronic device 500 may further include a sensor reading unit 507 for receiving and reading sensor information from one or more sensors in the acquisition object. Here, the electronic device 500 may transmit the read sensor information to the control apparatus as an acquisition result, or may partially process the read sensor information by itself.

The communication unit 501, the acquisition control unit 502, the image shooting unit 503, the sensing unit 504, the microphone/speaker 506 and the sensor reading unit 507 of the electronic device 500 are described above in detail. The communication unit 501 may be configured to perform communication between the electronic device 500 and the control apparatus. The acquisition control unit 502 may be configured to control the electronic device 500 to perform feature acquisition on the acquisition object based on the acquisition configuration information. The image shooting unit 503 may be configured to acquire the image of the acquisition object. The sensing unit 504 may be configured to acquire the depth, the temperature, the humidity, the gas density, the air velocity, the radiation intensity, the smell, the pressure and the smog of the acquisition object. The microphone/speaker 506 may be configured to acquire the voice of the acquisition object, and implement voice interaction between the acquisition object and the control apparatus. The sensor reading unit 507 may be configured to receive and read sensor information from one or more sensors in the acquisition object.

According to an embodiment of the present disclosure, the electronic device 500 may further include a position determination unit 505 for determining a position of the electronic device 500.

According to an embodiment of the present disclosure, the electronic device 500 may further include an information processing unit 508 for processing the acquisition result, such that the received acquisition configuration information can be further adjusted based on the feature of the acquisition object.

According to an embodiment of the present disclosure, the electronic device 500 may further include a radar 509 for implementing an obstacle avoidance function during flight of the electronic device 500.

According to an embodiment of the present disclosure, the electronic device 500 may further include a node control unit 510 for controlling other units of the electronic device 500 in a centralized manner.

According to an embodiment of the present disclosure, the electronic device 500 may further include a battery unit 511 for supplying power to the electronic device 500.

The electronic device 500 according to the embodiment of the present disclosure is described above in detail. With the electronic device 500 in a wireless communication system according to the present disclosure, feature acquisition may be performed based on the acquisition configuration information. In this manner, a proper acquisition policy can be set for the acquisition object, thereby optimizing the acquisition process.

The electronic device 500 described above may function as the acquisition node, and is controlled by the electronic device 100 which functions as a control apparatus. Therefore, all of the above embodiments concerning the electronic device 100 are applicable to this configuration example.

4. A Configuration Example of a Wireless Communication System

The electronic device 100 and the electronic device 500 according to the embodiments of the present disclosure are described above in detail. In the following, a wireless communication system according to an embodiment of the present disclosure is described in detail.

Figure 6:
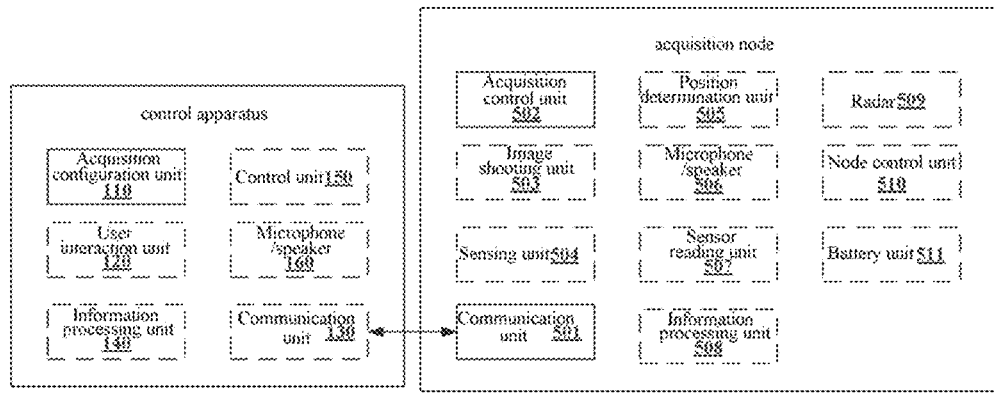
FIG. 6 is a block diagram illustrating a structure of a wireless communication system according to an embodiment of the present disclosure.

FIG. 6 is a block diagram illustrating a structure of a wireless communication system according to an embodiment of the present disclosure. As shown in FIG. 6, the wireless communication system according to the embodiment of the present disclosure may include the control apparatus and the acquisition node. Although only one acquisition node is shown in FIG. 6, the wireless communication system according to the embodiment of the present disclosure may include multiple acquisition nodes.

According to an embodiment of the present disclosure, the control apparatus may include a processing circuit configured to determine a parameter set for characterizing attributes of an acquisition object; and determine, based on the parameter set, acquisition configuration information concerning feature acquisition performed by an acquisition node on the acquisition object.

According to an embodiment of the present disclosure, the control apparatus may include one or more acquisition nodes, each of which includes a processing circuit configured to acquire the acquisition configuration information; and perform feature acquisition on the acquisition object based on the acquisition configuration information.

According to an embodiment of the present disclosure, the control apparatus and the acquisition node may communicate with each other through a communication unit 130 of the control apparatus and a communication unit 501 of the acquisition node. This communication may be, for example, wireless communication.

Figure 7:
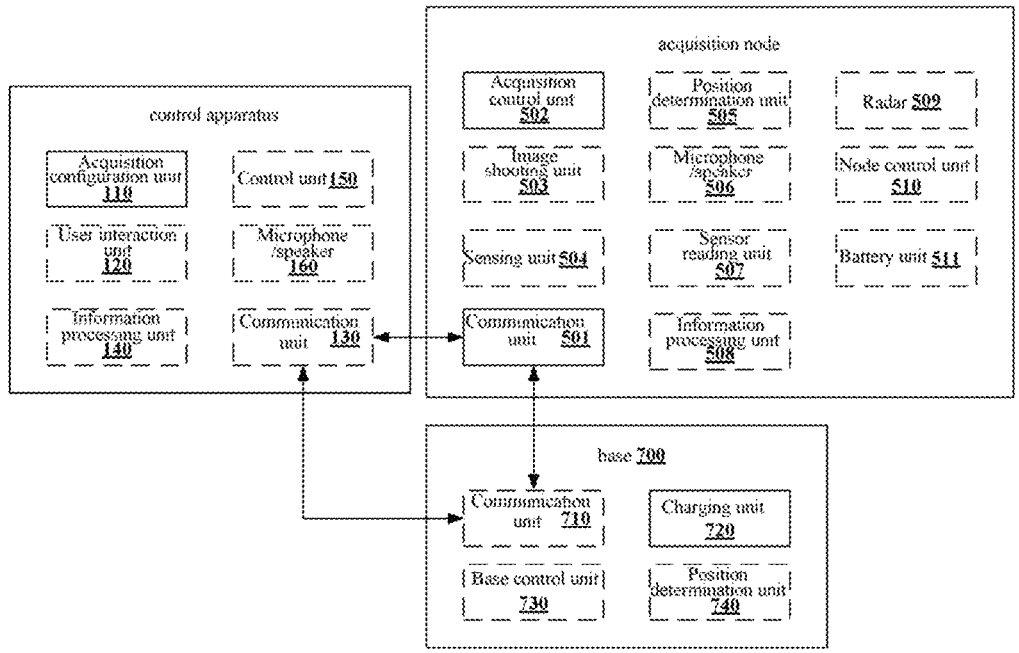
FIG. 7 is a block diagram illustrating a structure of a wireless communication system according to another embodiment of the present disclosure.

FIG. 7 is a block diagram illustrating a structure of a wireless communication system according to another embodiment of the present disclosure. As shown in FIG. 7, the wireless communication system may further include a base 700. According to an embodiment of the present disclosure, the base 700 may be configured to store and charge the one or more acquisition nodes.

As shown in FIG. 7, the base 700 may include a communication unit 710 for communicating with the control apparatus and the acquisition node. According to an embodiment of the present disclosure, the control apparatus may directly communicate with the acquisition node, or indirectly communicate with the acquisition node through the base 700.

As shown in FIG. 7, the base 700 may further include a charging unit 720 for charging the one or more acquisition node. For example, when the acquisition node finishes an acquisition task and is stored in the base 700, the acquisition node is connected to the base 700 for charging the acquisition node.

As shown in FIG. 7, the base 700 may further include a base control unit 730 for control the base 700 in a centralized manner.

Further, as shown in FIG. 7, the base 700 may further include a position determination unit 740 for determining a position of the base 700.

According to an embodiment of the present disclosure, the base 700 may be implemented in various shapes, for example, a container with an enclosed structure or semi-enclosed structure, or a base with an open structure.

The control apparatus described in this configuration example may be implemented by the electronic device 100 described above, and the acquisition node may be implemented by the electronic device 500 described above. Therefore, all of the above embodiments concerning the electronic device 100 and the electronic device 500 are applicable to this configuration example.

5. A Method Embodiment

In the following, a wireless communication method performed by the electronic device in a wireless communication system according to an embodiment of the present disclosure is described in detail.

Figure 8:
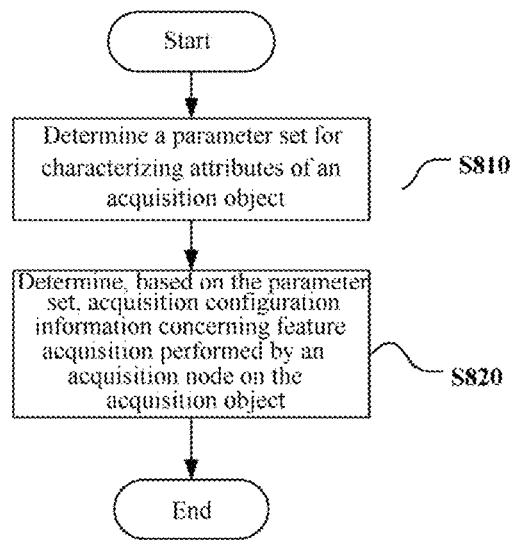
FIG. 8 is a flow chart illustrating a wireless communication method performed by an electronic device in a wireless communication system according to an embodiment of the present disclosure.

FIG. 8 is a flow chart illustrating a wireless communication method performed by an electronic device in a wireless communication system according to an embodiment of the present disclosure. The electronic device in this embodiment may be the electronic device 100. Therefore, all of the above embodiments concerning the electronic device 100 are applicable to this method embodiment.

As shown in FIG. 8, in step S810, a parameter set for characterizing attributes of an acquisition object is determined.

Next, in step S820, acquisition configuration information concerning feature acquisition performed by an acquisition node on the acquisition object is determined based on the parameter set.

Preferably, the parameter set comprises one or more of: a parameter characterizing a motion state of the acquisition object, a parameter characterizing a position relation between the acquisition object and the electronic device, a parameter characterizing a shape and a size of the acquisition object, and a parameter characterizing a category of the acquisition object.

Preferably, the method further includes: determining an acquisition position at which feature acquisition is performed on the acquisition object based on the parameter set. The acquisition configuration information includes position information of the acquisition position.

Preferably, the method further includes: determining the acquisition position based on feature acquisition capability of the acquisition node, a use condition of the acquisition node and characteristics of the acquisition object.

Preferably, the position information of the acquisition position includes: an actual position at which the acquisition node performs feature acquisition on the acquisition object, or a candidate position at which the acquisition node performs feature acquisition on the acquisition object.

Preferably, the position information of the acquisition position includes an envelope shape of the acquisition position.

Preferably, the method further includes: determining the acquisition position based on the envelope shape of the acquisition position and position information of one or more reference points.

Preferably, each acquisition position represents a position range in which the acquisition node performs feature acquisition on the acquisition object.

Preferably, the acquisition configuration information includes acquisition mode information concerning feature acquisition performed on the acquisition object.

Preferably, the acquisition mode information includes one or more of: hover shooting, rotating shooting, vibrating shooting between multiple acquisition positions at a predetermined frequency, and a motion correlation relative to the acquisition object.

Preferably, the acquisition configuration information includes an acquisition parameter of feature acquisition performed on the acquisition object.

Preferably, the acquisition parameter includes one or more of: image, voice, depth, temperature, humidity, gas density, air velocity, radiation intensity, smell, pressure and smog.

Preferably, the method further includes: transmitting the acquisition configuration information to one or more acquisition nodes; receiving an acquisition result of feature acquisition performed on the acquisition object from the one or more acquisition nodes; and processing the acquisition result from the one or more acquisition nodes to output a final output result.

Preferably, the method further includes: determine a feature sequence concerning feature acquisition performed to the acquisition object based on the parameter set; and process the acquisition result based on the feature sequence.

Preferably, the feature sequence includes at least one of a time sequence of one or more acquired features and an attribute sequence of one or more acquired features.

Preferably, in a case where the acquisition object is an antique to be classified, the attribute sequence includes one or more of: image contour, decorative pattern, material and texture, shape, ornamentation, body and glaze, and inscriptions; in a case where the acquisition object is a dynamic object of which a motion behavior is to be recorded, the attribute sequence includes one or more of: an image of the acquisition object, a gesture of the acquisition object, vital sign data of the acquisition object, and operation data of sports equipment used by the acquisition object; and in a case where the acquisition object is an environmental factor or event on a predetermined route, the attribute sequence includes one or more of: image, voice, temperature, humidity, air pressure, gas components, gas concentration, air velocity and sea wave height in a certain area on the predetermined route.

Figure 9:
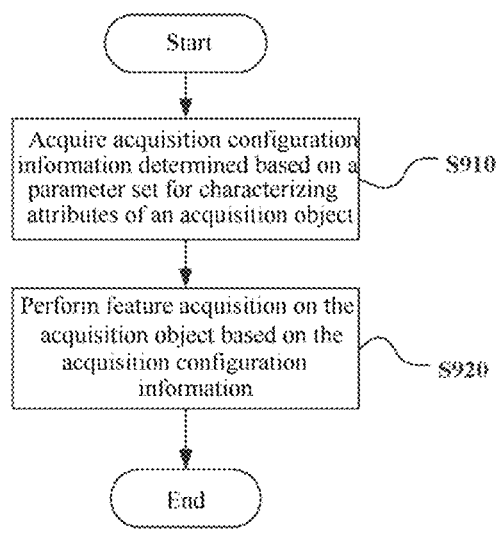
FIG. 9 is a flow chart illustrating a wireless communication method performed by an electronic device in a wireless communication system according to another embodiment of the present disclosure.

FIG. 9 is a flow chart illustrating a wireless communication method performed by an electronic device in a wireless communication system according to another embodiment of the present disclosure. The electronic device in this embodiment may be the electronic device 500. Therefore, all of the above embodiments concerning the electronic device 500 are applicable to this method embodiment.

As shown in FIG. 9, in step S910, acquisition configuration information determined based on a parameter set for characterizing attributes of an acquisition object is acquired.

Next, in step S920, feature acquisition is performed on the acquisition object based on the acquisition configuration information.

Preferably, the acquisition configuration information includes position information of multiple acquisition positions at which feature acquisition is performed on the acquisition object, and the method further includes: controlling the electronic device to perform feature acquisition on the acquisition object at the multiple acquisition positions.

Preferably, each of the acquisition positions represents a position range in which the acquisition node performs feature acquisition on the acquisition object, and the method further includes: controlling the electronic device to perform feature acquisition on the acquisition object within the position ranges corresponding to the multiple acquisition positions.

Preferably, the position information of the multiple acquisition positions includes multiple candidate positions at which the acquisition node performs feature acquisition on the acquisition object.

Preferably, the method further includes: determining, from the multiple candidate positions, multiple actual positions at which feature acquisition is performed on the acquisition object based on feature acquisition capability of the acquisition node, a use condition of the acquisition node and characteristics of the acquisition object.

Preferably, the acquisition configuration information includes acquisition mode information concerning feature acquisition performed on the acquisition object, and the method further includes: performing feature acquisition on the acquisition object in an acquisition mode included in the acquisition mode information.

Preferably, the acquisition mode information includes one or more of: hover shooting, rotating shooting, vibrating shooting between multiple acquisition positions at a predetermined frequency, and a motion correlation relative to the acquisition object.

Preferably, the acquisition configuration information includes an acquisition parameter of feature acquisition performed on the acquisition object, and the method further includes: performing feature acquisition on the acquisition parameter of the acquisition object.

Preferably, the acquisition parameter includes one or more of: image, voice, depth, temperature, humidity, gas density, air velocity, radiation intensity, smell, pressure and smog.

Preferably, the method further includes: receiving sensor information from one or more sensors in the acquisition object.

Preferably, the electronic device for performing the above method includes a smart drone.

6. Application Examples

The technology according to the present disclosure is applicable to various produces. For example, the electronic device 100 serving as the control apparatus may be a mobile terminal (such as a smartphone, a tablet personal computer (PC), a notebook PC, a portable game terminal, a portable/dongle mobile router and a digital camera device) or a vehicle terminal (such as an automobile navigation apparatus). Specifically, the electronic device 100 may also be implemented as a wearable device such as a VR headpiece and smart glasses. In addition, the electronic apparatus 100 may be a wireless communication module (such as an integrated circuit module including a single chip) installed in the above device, such as a system implemented by software, hardware and combination thereof.

The electronic device 500 serving as the acquisition node may be a device with a flying function and an acquisition function. The acquisition function includes acquisition of one or more of the following parameters of the acquisition object: image, voice, depth, temperature, humidity, gas density, air velocity, radiation intensity, smell, pressure and smog. For example, the electronic device 500 may be implemented as a smart dust with a flying function, a micro, small or large drone which integrates one or more of a shooting function, an infrared ranging function, a sensor reading function and a microphone/speaker, or the like.

The present disclosure is applicable to various fields such as the identification of Chinese and Western antiques, calligraphy and painting, luxury goods and buildings; classification and monitoring of wildlife; monitoring and training aiding of various outdoor sports such as motorcycles, cars, kayaks, and sailing boats; assisting in unmanned driving by monitoring road conditions using drones; monitoring the environment using drones; operating in hazardous environments (such as an area where nature disasters such as earthquakes, tsunamis, typhoons and hurricanes, forest fires, or volcanic explosions occur, or a nuclear radiation area) using drones, and the like. In the following, the electronic device, the wireless communication system and the method according to the present disclosure are described using four application examples.

First Application Example

Figure 10:
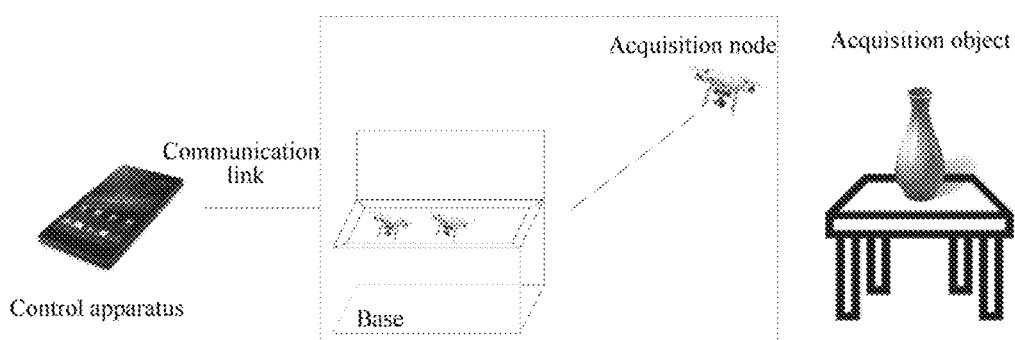
FIG. 10 is a schematic diagram illustrating a scenario of a first application example according to the present disclosure.

FIG. 10 is a schematic diagram illustrating a scenario of a first application example according to the present disclosure. As shown in FIG. 10, the control apparatus may be included in a smartphone, the acquisition node may be a smart dust with a flying function, the base may be a container with an enclosed or semi-enclosed structure, and the acquisition object may be an antique. As shown in FIG. 10, the smartphone directly controls the smart dust via a communication link, or indirectly controls the smart dust with the base via a communication link, to perform feature acquisition on the antique, thereby classifying and identifying the antique. This process is described in detail below.

Figure 11:
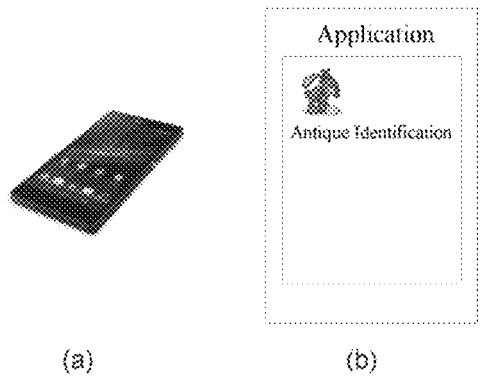
FIG. 11 is a schematic diagram illustrating operations in the first application example according to the present disclosure.

FIG. 11 is a schematic diagram illustrating operations in the first application example according to the present disclosure. As shown in FIG. 11, the control apparatus may be embedded into the smartphone as a software system or a hardware system. The user may start an "Antique Identification" application in the smartphone to initiate the process of antique identification.

Figure 12:
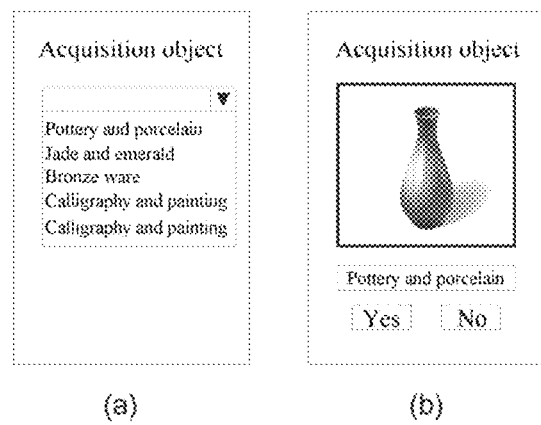
FIG. 12 is a schematic diagram illustrating operations in the first application example according to the present disclosure.

FIG. 12 is a schematic diagram illustrating operations in the first application example according to the present disclosure. As shown in part (a) of FIG. 12, the category of the acquisition object may be determined by the user. Here, the category of the antique may include pottery and porcelain, jade and emerald, bronze ware, calligraphy and painting, carvings and the like. In addition, as shown in part (b) of FIG. 12, the category of the antique may be automatically determined by the control apparatus. Here, the smartphone may capture an image of the antique, and determine the category of the antique based on the captured image. As shown in part (b) of FIG. 12, the control device in the smartphone recognizes the antique as pottery or porcelain, and asks the user to perform confirmation.

In this application example, the envelope shape of the candidate acquisition position is determined by the user. For example, the control apparatus provides selectable envelope shapes based on the category of the acquisition object, and the user makes a selection as needed. In addition, the user determines an absolute position of the reference point. Specifically, the user may set a certain acquisition node as an anchor acquisition node with the control apparatus, and cause the anchor acquisition node to hover at a suitable position through flying control, or manually moves the anchor acquisition node to a suitable position, and set the current position of the anchor acquisition node as a reference point. In this manner, the user may set positions of one or more reference points, such that the control apparatus can determine an absolute position of a candidate position based on the envelope shape and the absolute position of the reference point, and include the position information of the candidate acquisition position in the acquisition configuration information.

In addition, the control apparatus may determine the acquisition parameter as image based on the category of the acquisition object. Optionally, the control apparatus may include the acquisition parameter information in the acquisition configuration information.

Further, the control apparatus may determine a feature sequence based on the category of the acquisition object. The feature sequence may include shape, ornamentation, body and glaze, and inscriptions, and may also include a sequence of a certain feature at different positions. Optionally, the control apparatus may include the feature sequence in the acquisition configuration information.

Figure 13:
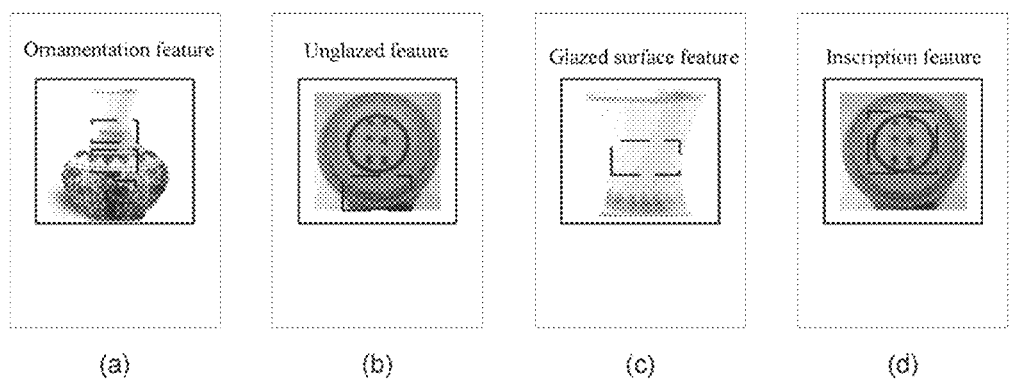
FIG. 13 is a schematic diagram illustrating a feature sequence in the first application example according to the present disclosure.

FIG. 13 is a schematic diagram illustrating the feature sequence in the first application example according to the present disclosure. The shape feature is not shown in FIG. 13. Here, the shape indicates a shape of an object, and may be further classified into the following local structures according to different portions: an opening, an abdomen, a bottom, a handle, an ear, a neck, a mouth, a rope wearing part, a foot and an inner portion of the proclaim. The ornamentation includes a subject, a decorative method, or a technology. The body and glaze may be analyzed from an unglazed portion of the foot, by studying the purity of the clay and the density of body. The glaze is analyzed based on the fineness of the glaze, the condition of the luster, the thickness of the glaze layer, and the size and thickness of bubbles. The inscriptions include the brushwork of the inscription, the structure of words, the arrangement of words, the position of the inscription, and the intensity and the shade of the color of the inscription. The above features vary over time, and are used as powerful evidences for distinguishing between real porcelain and a fake one as well as dating porcelain.

In addition, the control apparatus may further configure the acquisition mode and the basic configuration of the acquisition node. When the acquisition configuration process is finished, the user may activate an acquisition operation through a user interface, such that the acquisition configuration information is transmitted to the acquisition node. After that, the acquisition node performs feature acquisition on the acquisition object.

Here, the shape may be acquired by extracting an image contour of the acquisition object or by reconstructing a 3D model. The ornamentation may be acquired by extracting a local image including patterns acquired by partitioning the image based on portions or based on contours specified by the user. The body and glaze may be acquired based on patterns and textures of the unglazed portion of the foot and the glazed surface, in combination with extraction results of textures acquired by a tactile sensor, as well as a sound produced by the porcelain when tapped. The inscriptions can be acquired by extracting a local image.

Next, when the acquisition node finishes the acquisition task, the control apparatus issues a node recovery instruction to the acquisition node. On reception of the instruction, the acquisition node activates a wireless connection with the base, receives position information of the base, locate a corresponding position slot on the base and flies back to the position slot.

Here, the time for transmitting the acquisition result is determined based on factors such as the electricity amount of the acquisition node and the quality of the link between the acquisition node and the control apparatus. For example, the acquisition node may transmit an acquisition result to the control apparatus when the acquisition node finishes the feature acquisition task at each actual acquisition position. Alternatively, the acquisition node may transmit all acquisition results to the control apparatus when the acquisition node is recovered to the base.

Next, the control apparatus may initiate information processing, input the acquisition result of a machine learning model, and acquire a classification result through training. In this application example, the final result may include classification results concerning an age and a genre. For example, "The acquisition object complies with features of the N kiln in the M dynasty" or "Information with which the acquisition object is complied is not found". If the classification result is not null, it is indicated that the features acquired by the user match the category. Otherwise, it is indicated that the input does not belong to any existing category in the system. If the classification of categories provided by the system is complete, and the input does not belong to any existing category in the system, it is likely that the acquisition object is a fake. In addition, different types of features may be separately inputted for classification, to acquire classification results concerning the age and the genre for each type of features. If these results are not null and have intersection, it is indicated that the feature acquired by the user matches the category. Otherwise, it is indicated that the feature does not match existing categories provided by the system.

The following exemplary final results may be provided: "The acquisition object complies with features of the Bingmei-patterned bowl in the Qing Dynasty of Kangxi Emperor"; "The acquisition object complies with features of the Doucai Dongshi Huadie-patterned dish in the Qing Dynasty of Yongzheng Emperor", and the like.

As described above, in the first application example, the wireless communication system according to the present disclosure may be used for identifying the age and the genre of the antique, such that non-professionals can also perform professional antique identification using the wireless communication system according to the present disclosure.

Second Application Example

Figure 14:
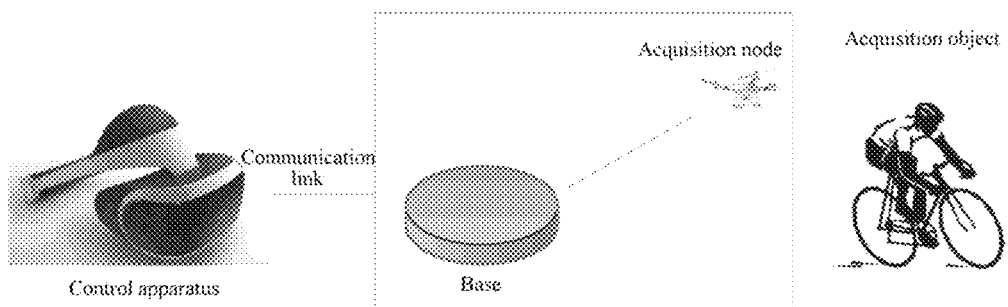
FIG. 14 is a schematic diagram illustrating a scenario of a second application example according to the present disclosure.

FIG. 14 is a schematic diagram illustrating a scenario of a second application example according to the present disclosure. As shown in FIG. 14, the control apparatus may be included in a VR headpiece, the acquisition node may be a drone having an image capture function, the base may be a seat having an open structure, and the acquisition object may be a cyclist. As shown in FIG. 14, the VR headpiece directly controls the drone via a communication link, or indirectly controls the drone with the base via a communication link, to trace a sport behavior of the cyclist, thereby assisting in training. This process is described in detail below.

First, the user may obtain the visual field of the drone by starting software associated with the drone in the VR headpiece, and control flight of the drone with a gesture recognition technology.

Figure 15:
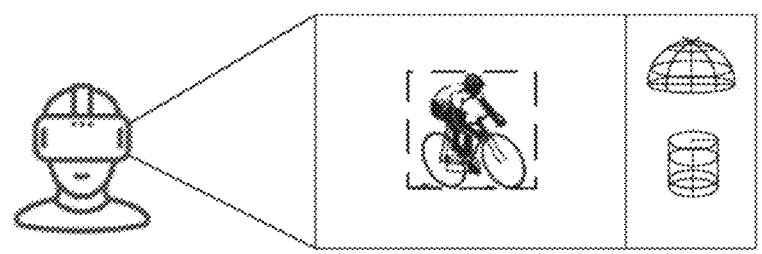
FIG. 15 is a schematic diagram illustrating operations in the second application example according to the present disclosure.
Figure 15:
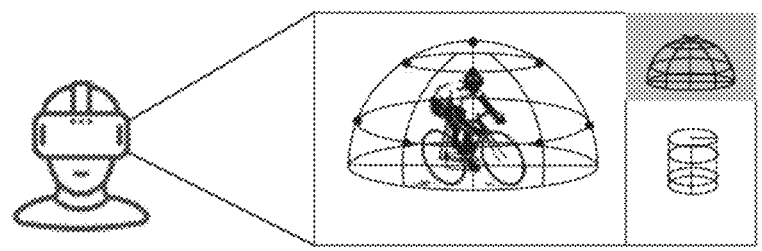
Figure 15:
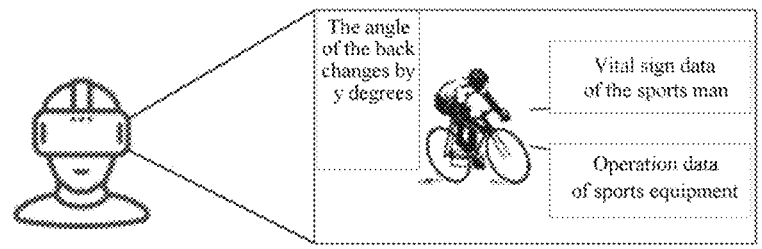

FIG. 15 is a schematic diagram illustrating operations in the second application example according to the present disclosure. As shown in part (a) of FIG. 15, an information processing unit in the VR headpiece may provide recognition and a prompt regarding an object in the screen. The user may lock the acquisition object by clicking an identification icon through a gesture operation as needed. If the acquisition object is dynamitic, a tracking mode may be initiated.

In this application example, the VR headpiece may provide options of the envelope shape, such that the user may select a suitable envelope shape. As shown in part (b) of FIG. 15, when the user selects a suitable envelope shape, the screen in the VR headpiece displays the acquisition object and the envelope shape superimposed thereon in a manner of augmented reality (AR).

Next, the acquisition node may estimate a size of the acquisition object and a distance from the acquisition object through a ranging function and calculate an absolute position of the reference points, thereby determining a position of the envelope shape in the coordinate system based on the envelope shape and the absolute position of the reference points, and determining an absolute position of the actual acquisition position. As shown in part (b) of FIG. 15, the actual acquisition position is synchronously displayed on the screen of the VR headpiece.

In addition, the control apparatus may determine the acquisition parameter to be image, depth and voice.

Further, the control apparatus may also determine a feature sequence including the attribute sequence and the time sequence. For example, the attribute sequence includes one or more of an image of the acquisition object, a gesture of the acquisition object, vital sign data of the acquisition object, and operation data of sports equipment used by the acquisition object. The time sequence includes changes in the above features over time.

Further, the control apparatus may also determine the acquisition mode.

Next, the user may click the actual acquisition position, to adjust the acquisition node to the actual acquisition position, where the acquisition node performs feature acquisition based on the acquisition configuration information. In addition, during the feature acquisition process, the user (for example, the coach of the cyclist) may perform speech communication with the acquisition object through a microphone/speaker in the control apparatus. Further, the acquisition node may also read data transmitted by sensors on the acquisition object (including the cyclist and the bicycle) in a real-time manner with a sensor reading unit in the acquisition node.

Next, the acquisition node may transmit the acquisition result to the VR headpiece in a real-time manner for data analysis, for example, for generating a three-dimensional mode of the motion. A difference analysis result may be acquired by comparing a model record and the real-time screen display.

In the second application example, the final output result may be the analysis result of the difference between the model record and the real-time screen display, which may be superimposed on the real-time screen display in a manner of augmented reality. In addition, the user may switch between the real-time tracking screen display and the constructed three-dimensional model. As shown in part (c) of FIG. 15, notations may be superimposed on the real-time screen display using data from sensors on the acquisition object which is read by the sensor reading unit, thereby acquiring vital sign data of the cyclist and operation data of the sports equipment. For example, a notation "the angle of the back changes by y degrees" may be added based on a result acquired by analyzing an acquired image.

As described above, in the second application example, the wireless communication system according to the present disclosure may be used for recording and tracking the motion behavior of the cyclist, thereby assisting in training of the cyclist.

Third Application Example

Figure 16:
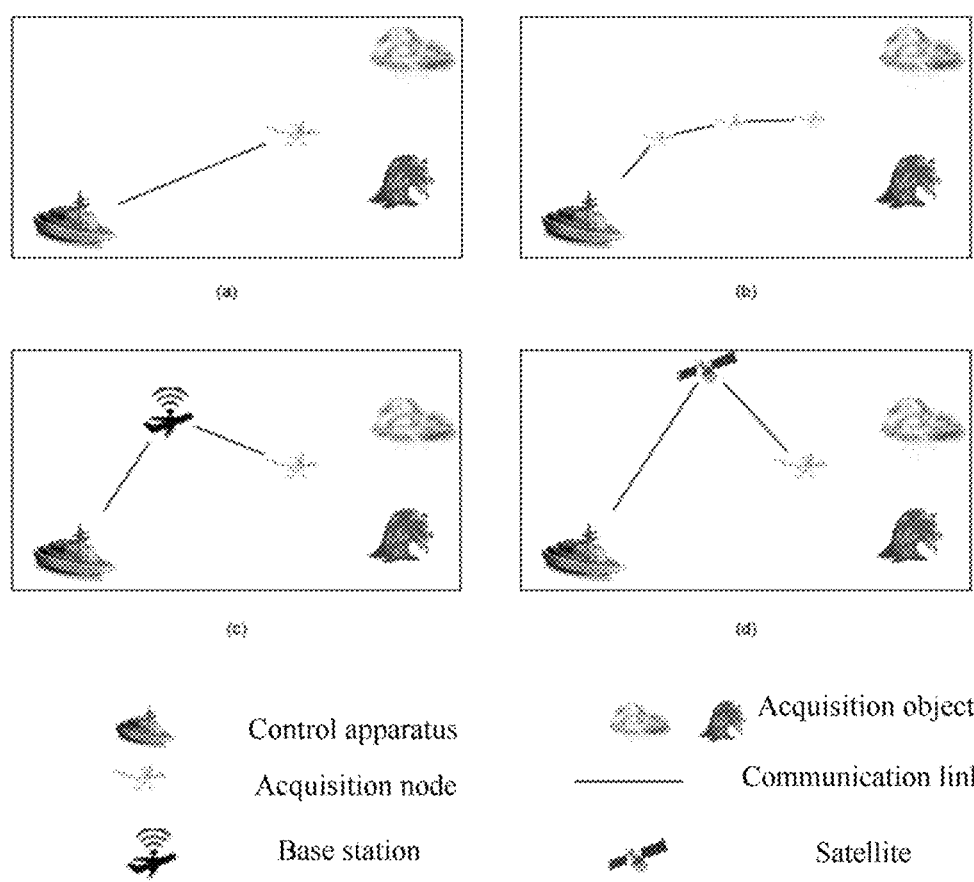
FIG. 16 is a schematic diagram illustrating a scenario of a third application example according to the present disclosure.

FIG. 16 is a schematic diagram illustrating a scenario of a third application example according to the present disclosure. As shown in FIG. 16, the control apparatus may be included in a computer communication system on a ship, the acquisition node may be a large drone having an image capture function, the base may be a ship-borne platform, and the acquisition object may be a weather condition or a water condition on a route of the ship.

As shown in part (a) of FIG. 16, the computer communication system on the ship directly controls the drone via a communication link. As shown in part (b) of FIG. 16, multiple drones form a multi-hop transmission network. When the drone is distant from the ship, the computer communication system on the ship can control the drone through the multi-hop transmission network. As shown in part (c) of FIG. 16, a relay network is formed between the drone and the computer communication system on the ship through a base station, to enable computer communication system on the ship to control the drone. The base station may be carried by a drone (or a balloon) and operates in the air. Of course, the base station may also be arranged on land or on the sea. As shown in part (d) of FIG. 16, the relay network is formed between the drone and the computer communication system on the ship through a satellite, to enable computer communication system on the ship to control the drone. This process is described in detail below.

First, the user starts a system or software embedded in the computer communication system. The user may obtain the visual field of the drone through the display screen of the computer, and control flight of the drone through a man-machine interaction interface (which is similar to a joystick of a plane, for example).

Next, the user transmits ship route information to the acquisition node. The acquisition node detects water and weather conditions along the ship route (especially the route ahead) within a range in which the drone is capable of communicating with the ship, and automatically recognizes the acquisition object such as a storm, a wave, an iceberg and an island.

In the third application example, the acquisition node may automatically select the envelop shape and determine the absolute position of the reference point according to the acquisition object, thereby determining the absolute position of the actual acquisition position. The activated actual acquisition position is synchronously displayed on the real-time monitoring screen display of the computer communication system.

Here, the control apparatus may determine the acquisition parameter to be image, depth, voice, environment parameter, and the like.

Further, the control apparatus may also determine the feature sequence, including the attribute sequence and the time sequence. For example, the attribute sequence includes one or more of image, voice, temperature, humidity, air pressure, gas components, gas concentration, air velocity and sea wave height in a certain area on the predetermined route. The time sequence includes changes in the above features over time.

Further, the control apparatus may also determine the acquisition mode.

Next, the user may click the activated actual acquisition position, to adjust the acquisition node to the position, where the acquisition node performs feature acquisition based on the acquisition configuration information.

Next, the acquired features may be transmitted to the computer communication system in a real-time manner for data analysis. Preliminary analysis may also be performed on the acquired features at the acquisition node with an information processing unit, and abnormal information which affects the route is transmitted to the control apparatus for further data analysis, or is transmitted back as an alarm.

In the third application example, the final output result may include alarm information concerning weather and water. The alarm information is superimposed on the real-time screen display in a manner of augmented reality, and is displayed on the screen of the computer controller. Further, the alarm information may be directly associated with a ship driving system for automatically modifying the route to avoid dangerous conditions.

As described above, in the third application example, the wireless communication system according to the present disclosure may be used for predicting weather and sea conditions on the route ahead of the ship, thereby avoiding dangerous conditions and providing the possibility of automatic driving of the ship.

Fourth Application Example

Figure 17:
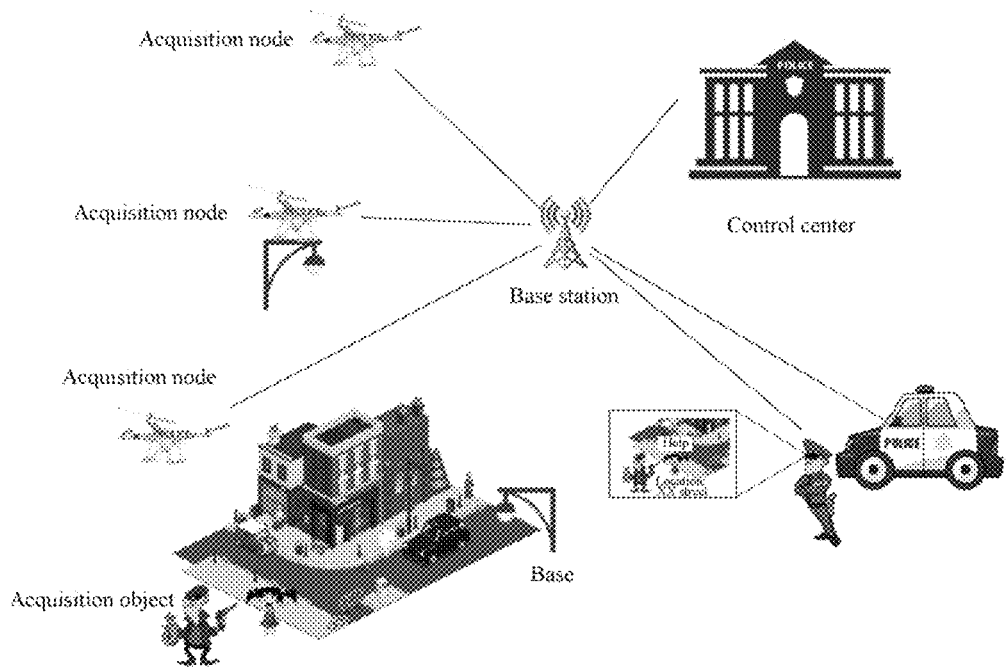
FIG. 17 is a schematic diagram illustrating a scenario of a fourth application example according to the present disclosure.

FIG. 17 is a schematic diagram illustrating a scenario of a fourth application example according to the present disclosure. As shown in FIG. 17, the control apparatus may be included in a computer communication system of a control center, the acquisition node may be a drone having an image capture function, the base may be a device provided on a vehicle or distributed on a side of a road within a monitoring range, and the acquisition object may be an abnormal event such as robbery, discard of dangerous objects and traffic accidents.

In this application example, patrolling drones as acquisition nodes forms a monitoring network for outdoor monitoring. The monitoring information may be transmitted to a control apparatus in the control center though a base station. The control center is established by the police department for controlling the entire patrolling drone monitoring network. On-board computer terminals on police cars and smart portable terminals (such as smart glasses and smart phones) carried by policemen in this region may access the monitoring network, for controlling, querying monitoring information, and sending or receiving abnormal event alarms.

First, a user in the control center may activate drones or smart terminals in the entire monitoring network.

Next, the control apparatus may respectively set monitoring ranges and monitoring routes for drones numbered differently, and schedule monitoring tasks of the drones. For example, a drone with insufficient electricity may be dispatched to a suitable base (which is close to the drone and has an available charging position) for being charged. The drone being charged may enter a fixed monitoring node operation mode. The route previously to be monitored by the drone being charged may be allocated to another drone by the monitoring center, thereby avoiding blind areas and interruptions in monitoring.

In this application example, the acquisition node may automatically select the envelop shape and determine the absolute position of the reference point according to the acquisition object, thereby determining the absolute position of the actual acquisition position. The activated actual acquisition position is synchronously displayed on the real-time monitoring screen display of the control center.

Next, the control apparatus may determine the acquisition parameter to be image, voice, toxic gas and the like.

Further, the control apparatus may also determine the feature sequence, including the attribute sequence and the time sequence. For example, the attribute sequence includes one or more of: an image of an abnormal event such as robbery, discard of dangerous objects and a traffic accident; a voice from the abnormal event such as a voice crying for help or explosion; and a toxic gas. The time sequence includes changes in the above features over time.

Further, the control apparatus may also determine the acquisition mode.

Next, the acquisition node may be automatically adjusted to the determined actual acquisition position, where the acquisition node performs feature acquisition based on the acquisition configuration information.

Next, the acquisition node transmits the monitoring information to the control center in a real-time manner for analysis and backup. The control center may identify abnormal events based on the monitoring information. Preliminary identification may also be performed on the abnormal events at the acquisition node with an information processing unit. The identified abnormal event directly triggers generation of alarm information, which is transmitted throughout the network.

In the fourth application example, the outputted final result may be alarm information for various abnormal events. In addition, the alarm information may also directly trigger the smart terminal, such as the smart glasses worn by the policeman or the smart on-board terminal on the police car shown in FIG. 17. On reception of the alarm information, the policeman takes an action such as answering and starting for the event, or requesting for reinforcements. For example, in FIG. 17, it is determined that a robbery occurs in XX street based on images and voices with the smart glasses, and the policeman answers and starting for the event.

As described above, in the fourth application example, the wireless communication system according to the present disclosure may be used for monitoring abnormal events, thereby assisting in security administration by the police department, thus social security is ensured.

It should be understood that, machine-readable instruction codes in a computer-readable storage medium and a program product according to an embodiment of the present disclosure may also be configured to perform methods corresponding to the above device embodiments. Therefore, one can refer to the above description in corresponding positions for contents which are not described in detail here and are not repeated.

Accordingly, a memory medium for carrying the program product in which machine-readable instruction codes are stored is also covered in the present disclosure. The memory medium includes but is not limited to soft disc, optical disc, magnetic optical disc, memory card, memory stick and the like.

Figure 18:
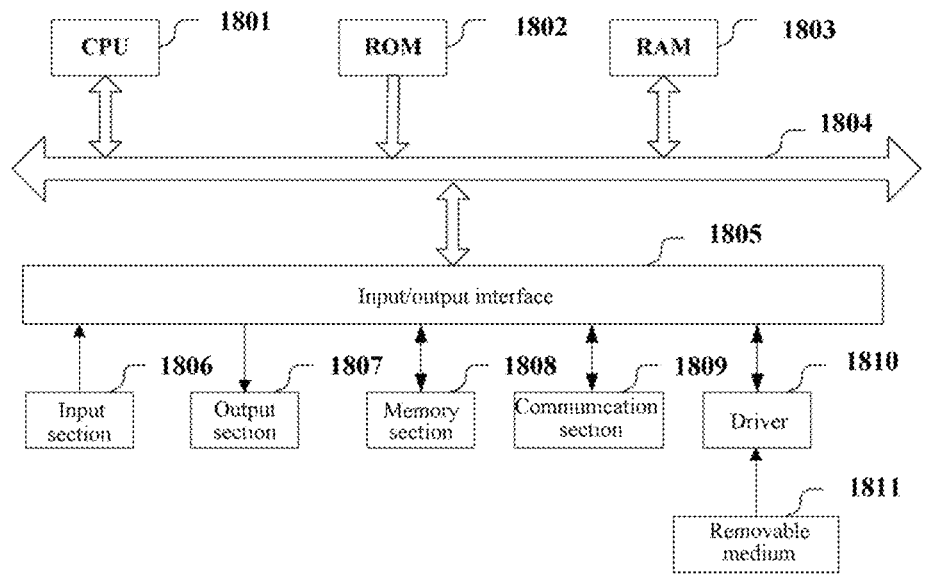
FIG. 18 is a block diagram illustrating an exemplary structure of a general-purpose personal computer which may function as the electronic device according to the present disclosure.

7. A Computer Device for Implementing the Device and the Method According to the Embodiments of the Present Disclosure Further, it is to be noted that, the above series of processing and devices may also be realized by software and/or firmware. In the case where the present disclosure is realized by software or firmware, a program constituting the software is installed in a computer with a dedicated hardware structure (e.g. the general purpose personal computer 1800 shown in FIG. 18) from a storage medium or network, where the computer is capable of implementing various functions when installed with various programs. FIG. 18 is a block diagram illustrating an exemplary structure of a personal computer which may function as the electronic device according to the present disclosure.

In FIG. 18, a central processing unit (CPU) 1801 executes various processing based on a program stored in a read-only memory (ROM) 1802 or a program loaded to a random access memory (RAM) 1803 from a memory section 1808. The data needed for the various processing of the CPU 1801 may be stored in the RAM 1803 as needed.

The CPU 1801, the ROM 1802 and the RAM 1803 are linked with each other via a bus 1804. An input/output interface 1805 is also linked to the bus 1804.

The following components are linked to the input/output interface 1805: an input section 1806 (including keyboard, mouse and the like), an output section 1807 (including displays such as a cathode ray tube (CRT), a liquid crystal display (LCD), a loudspeaker and the like), a memory section 1808 (including hard disc and the like), and a communication section 1809 (including a network interface card such as a LAN card, modem and the like). The communication section 1809 performs communication processing via a network such as the Internet.

A driver 1810 may also be linked to the input/output interface 1805 as needed. If needed, a removable medium 1811, for example, a magnetic disc, an optical disc, a magnetic optical disc, a semiconductor memory and the like, may be installed in the driver 1810, so that the computer program read therefrom is installed in the memory section 1808 as appropriate.

In the case where the foregoing series of processing is achieved by software, programs forming the software are installed from a network such as the Internet or a memory medium such as the removable medium 1811.

It should be appreciated by those skilled in the art that the memory medium is not limited to the removable medium 1811 shown in FIG. 18, which has program stored therein and is distributed separately from the apparatus so as to provide the programs to users. The removable medium 1811 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 1802 and the memory section 1808 in which programs are stored, and can be distributed to users along with the device in which they are incorporated.

Preferred embodiments of the disclosure have been described above with reference to the drawings, but the disclosure is not limited to the above examples of course. Those skilled in the art may devise various alternations and modifications within the scope of the appended claims, and it should be understood that these alternations and modifications would naturally fall within the technical scope of the disclosure.

For example, in the drawings, units shown by dashed boxes in the functional block diagram are optional functional units in a corresponding apparatus, and the optional functional units may be combined in a suitable manner to achieve a required function.

For example, multiple functions included in one unit in the above embodiments may be implemented by separated devices. Alternatively, multiple functions implemented by multiple units in the above embodiments may be implemented by separated devices respectively. Furthermore, one of the above functions may be implemented by multiple units. Without saying, such configuration is included in the technical scope of the disclosure.

In this specification, the steps described in the flow charts include not only processes performed in the sequential order as described chronically, but also processes performed concurrently or separately but not necessarily chronically. Further, even in the steps processed chronically, without saying, the order can be appropriately changed.

In addition, according to the technology according to the present disclosure, the following configuration can be performed.

(1). An electronic device in a wireless communication system, comprising a processing circuit configured to:
determine a parameter set for characterizing attributes of an acquisition object; and
determine, based on the parameter set, acquisition configuration information concerning feature acquisition performed by an acquisition node on the acquisition object.

(2). The electronic device according to (1), wherein the parameter set comprises one or more of:
a parameter characterizing a motion state of the acquisition object,
a parameter characterizing a position relation between the acquisition object and the electronic device,
a parameter characterizing a shape and a size of the acquisition object, and
a parameter characterizing a category of the acquisition object.

(3). The electronic device according to (1), wherein the processing circuit is configured to: determine an acquisition position at which feature acquisition is performed on the acquisition object based on the parameter set, and the acquisition configuration information determined by the processing circuit comprises position information of the acquisition position.

(4). The electronic device according to (3), wherein the processing circuit is configured to:
determine the acquisition position based on feature acquisition capability of the acquisition node, a use condition of the acquisition node and characteristics of the acquisition object.

(5). The electronic device according to (3), wherein the position information of the acquisition position comprises:
an actual position at which the acquisition node performs feature acquisition on the acquisition object, or
a candidate position at which the acquisition node performs feature acquisition on the acquisition object.

(6). The electronic device according to (3), wherein the position information of the acquisition position comprises an envelope shape of the acquisition position.

(7). The electronic device according to (6), wherein the processing circuit is configured to:
determine the acquisition position based on the envelope shape of the acquisition position and position information of one or more reference points.

(8). The electronic device according to (3), wherein each acquisition position represents a position range in which the acquisition node performs feature acquisition on the acquisition object.

(9). The electronic device according to (1), wherein the acquisition configuration information determined by the processing circuit comprises acquisition mode information concerning feature acquisition performed on the acquisition object.

(10). The electronic device according to (9), wherein the acquisition mode information comprises one or more of: hover shooting, rotating shooting, vibrating shooting among a plurality of acquisition positions at a predetermined frequency, and a motion correlation relative to the acquisition object.

(11). The electronic device according to (1), wherein the acquisition configuration information determined by the processing circuit comprises an acquisition parameter of feature acquisition performed on the acquisition object.

(12). The electronic device according to (11), wherein the acquisition parameter comprises one or more of: image, voice, depth, temperature, humidity, gas density, air velocity, radiation intensity, smell, pressure and smog.

(13). The electronic device according to (1), wherein the processing circuit is configured to:
transmit the acquisition configuration information to one or more acquisition nodes;
receive an acquisition result of feature acquisition performed on the acquisition object from the one or more acquisition nodes; and
process the acquisition result from the one or more acquisition nodes to output a final output result.

(14). The electronic device according to (13), wherein the processing circuit is configured to:
determine a feature sequence concerning feature acquisition performed to the acquisition object based on the parameter set; and process the acquisition result based on the feature sequence.

(15). The electronic device according to (14), wherein the feature sequence comprises at least one of a time sequence of one or more acquired features and an attribute sequence of one or more acquired features.

(16). The electronic device according to (15), wherein in a case where the acquisition object is an antique to be classified, the attribute sequence comprises one or more of: image contour, decorative pattern, material and texture, shape, ornamentation, body and glaze, and inscriptions;

in a case where the acquisition object is a dynamic object of which a motion behavior is to be recorded, the attribute sequence comprises one or more of: an image of the acquisition object, a gesture of the acquisition object, vital sign data of the acquisition object, and operation data of sports equipment used by the acquisition object; and in a case where the acquisition object is an environmental factor or event on a predetermined route, the attribute sequence comprises one or more of: image, voice, temperature, humidity, air pressure, gas components, gas concentration, air velocity and sea wave height in a certain area on the predetermined route.

(17). An electronic device in a wireless communication system, comprising a processing circuit configured to:

acquire acquisition configuration information determined based on a parameter set for characterizing attributes of an acquisition object; and perform feature acquisition on the acquisition object based on the acquisition configuration information.

(18). The electronic device according to (17), wherein the acquisition configuration information comprises position information of a plurality of acquisition positions at which feature acquisition is performed on the acquisition object, and the processing circuit is configured to control the electronic device to perform feature acquisition on the acquisition object at the plurality of acquisition positions.

(19). The electronic device according to (18), wherein each of the acquisition positions represents a position range in which the acquisition node performs feature acquisition on the acquisition object, and the processing circuit is configured to control the electronic device to perform feature acquisition on the acquisition object within the position ranges corresponding to the plurality of acquisition positions.

(20). The electronic device according to (18), wherein the position information of the plurality of acquisition positions comprises a plurality of candidate positions at which the acquisition node performs feature acquisition on the acquisition object.

(21). The electronic device according to (20), wherein the processing circuit is configured to:

determine, from the plurality of candidate positions, a plurality of actual positions at which feature acquisition is performed on the acquisition object based on feature acquisition capability of the acquisition node, a use condition of the acquisition node and characteristics of the acquisition object.

(22). The electronic device according to (17), wherein the acquisition configuration information comprises acquisition mode information concerning feature acquisition performed on the acquisition object, and the processing circuit is configured to control the electronic device to perform feature acquisition on the acquisition object in an acquisition mode included in the acquisition mode information.

(23). The electronic device according to (22), wherein the acquisition mode information comprises one or more of: hover shooting, rotating shooting, vibrating shooting among a plurality of acquisition positions at a predetermined frequency, and a motion correlation relative to the acquisition object.

(24). The electronic device according to (17), wherein the acquisition configuration information comprises an acquisition parameter of feature acquisition performed on the acquisition object, and the processing circuit is configured to control the electronic device to perform feature acquisition on the acquisition parameter of the acquisition object.

(25). The electronic device according to (24), wherein the acquisition parameter comprises one or more of: image, voice, depth, temperature, humidity, gas density, air velocity, radiation intensity, smell, pressure and smog.

(26). The electronic device according to (17), wherein the processing circuit is configured to:

receive sensor information from one or more sensors in the acquisition object.

(27). The electronic device according to (17), wherein the electronic device comprises a smart drone.

(28). A wireless communication system, comprising:

a control apparatus, comprising a processing circuit configured to:

determine a parameter set for characterizing attributes of an acquisition object; and determine, based on the parameter set, acquisition configuration information concerning feature acquisition performed by an acquisition node on the acquisition object; and one or more acquisition nodes, each of which comprises a processing circuit configured to:

acquire the acquisition configuration information; and perform feature acquisition on the acquisition object based on the acquisition configuration information.

(29). The wireless communication system according to (28), wherein the wireless communication system further comprises a base for storing and charging the one or more acquisition nodes.

(30). A wireless communication method performed by an electronic device in a wireless communication system, comprising:

determining a parameter set for characterizing attributes of an acquisition object; and determining, based on the parameter set, acquisition configuration information concerning feature acquisition performed by an acquisition node on the acquisition object.

(31). A wireless communication method performed by an electronic device in a wireless communication system, comprising:

acquiring acquisition configuration information determined based on a parameter set for characterizing attributes of an acquisition object; and performing feature acquisition on the acquisition object based on the acquisition configuration information.

(32). A computer-readable storage medium, comprising computer-executable instructions, which causes a computer to execute the wireless communication method according to claim 30 or 31 when executed by the computer.

Although the embodiments of the present disclosure have been described above in detail in connection with the drawings, it shall be appreciated that the embodiments as described above are merely illustrative rather than limitative for the present disclosure. Those skilled in the art can make various modifications and variations to the above embodiments without departing from the spirit and scope of the present disclosure. Therefore, the scope of the present disclosure is defined merely by the appended claims and their equivalents.

The invention claimed is:

1. An electronic device in a wireless communication system, comprising a processing circuit configured to:
   determine a parameter set for characterizing image attributes of an acquisition object; determine, based on the parameter set, acquisition configuration information concerning a feature acquisition to be performed by an acquisition node on the acquisition object; and
   transmit the acquisition configuration information to the acquisition node;
   receive, from the acquisition node, an acquisition result of a feature acquisition subsequently performed on the acquisition object by the acquisition node; and
   process the acquisition result from the acquisition node to output a final output result,
   wherein the acquisition object is a tangible object.

2. The electronic device according to claim 1, wherein the parameter set comprises one or more of:
   a parameter characterizing a motion state of the acquisition object, a parameter characterizing a position relation between the acquisition object and the electronic device,
   a parameter characterizing a shape and a size of the acquisition object, and a parameter characterizing a category of the acquisition object.

3. The electronic device according to claim 1, wherein the processing circuit is configured to: determine an acquisition position at which feature acquisition is to be performed by the acquisition node on the acquisition object based on the parameter set, and the acquisition configuration information determined by the processing circuit comprises position information of the acquisition position.

4. The electronic device according to claim 3, wherein the processing circuit is configured to:
   determine the acquisition position based on a feature acquisition capability of the acquisition node, a use condition of the acquisition node and characteristics of the acquisition object.

5. The electronic device according to claim 3, wherein the position information of the acquisition position comprises:
   an actual position at which the acquisition node is to perform the feature acquisition on the acquisition object, or a candidate position at which the acquisition node is to perform the feature acquisition on the acquisition object.

6. The electronic device according to claim 3, wherein the position information of the acquisition position comprises an envelope shape of the acquisition position.

7. The electronic device according to claim 6, wherein the processing circuit is configured to: determine the acquisition position based on the envelope shape of the acquisition position and position information of one or more reference points.

8. The electronic device according to claim 3, wherein each acquisition position represents a position range in which the acquisition node is to perform the feature acquisition on the acquisition object.

9. The electronic device according to claim 1, wherein the acquisition configuration information determined by the processing circuit comprises acquisition mode information concerning the feature acquisition to be performed on the acquisition object.

10. The electronic device according to claim 9, wherein the acquisition mode information comprises one or more of: hover shooting, rotating shooting, vibrating shooting among a plurality of acquisition positions at a predetermined frequency, and a motion correlation relative to the acquisition object.

11. The electronic device according to claim 1, wherein the acquisition configuration information determined by the processing circuit comprises an acquisition parameter of the feature acquisition to be performed on the acquisition object.

12. The electronic device according to claim 11, wherein the acquisition parameter comprises one or more of: image, voice, depth, temperature, humidity, gas density, air velocity, radiation intensity, smell, pressure and smog.

13. The electronic device according to claim 1, wherein the processing circuit is configured to: determine a feature sequence concerning the feature acquisition subsequently performed to the acquisition object based on the parameter set; and process the acquisition result based on the feature sequence.

14. The electronic device according to claim 13, wherein the feature sequence comprises at least one of a time sequence of one or more acquired features and an attribute sequence of one or more acquired features.

15. The electronic device according to claim 14, wherein in a case where the acquisition object is an antique to be classified, the attribute sequence comprises one or more of: image contour, decorative pattern, material and texture, shape, ornamentation, body and glaze, and inscriptions;
   in a case where the acquisition object is a dynamic object of which a motion behavior is to be recorded, the attribute sequence comprises one or more of: an image of the acquisition object, a gesture of the acquisition object, vital sign data of the acquisition object, and operation data of sports equipment used by the acquisition object; and
   in a case where the acquisition object is an environmental factor or event on a predetermined route, the attribute sequence comprises one or more of: image, voice, temperature, humidity, air pressure, gas components, gas concentration, air velocity and sea wave height in a certain area on the predetermined route.

16. An electronic device in a wireless communication system, comprising a processing circuit configured to:
   acquire, from a control device, acquisition configuration information determined based on a parameter set for characterizing image attributes of an acquisition object, wherein the acquisition configuration information comprises acquisition mode information concerning a feature acquisition to be performed on the acquisition object; and
   perform the feature acquisition on the acquisition object based on the acquisition configuration information,
   wherein the feature acquisition is performed in an acquisition mode included in the acquisition mode information,
   wherein the acquisition object is a tangible object, and
   wherein the acquisition mode information comprises one or more of: hover shooting, rotating shooting, vibrating shooting among a plurality of acquisition positions at a predetermined frequency, and a motion correlation relative to the acquisition object.

17. The electronic device according to claim 16, wherein the acquisition configuration information comprises position information of a plurality of acquisition positions at which the feature acquisition is to be performed on the acquisition object, and the processing circuit is configured to control the electronic device to perform the feature acquisition on the acquisition object at the plurality of acquisition positions.

18. The electronic device according to claim 17, wherein each of the acquisition positions represents a position range in which the electronic device is to perform the performs feature acquisition on the acquisition object, and the processing circuit is configured to control the electronic device to perform the feature acquisition on the acquisition object within the position ranges corresponding to the plurality of acquisition positions.

19. The electronic device according to claim 17, wherein the position information of the plurality of acquisition positions comprises a plurality of candidate positions at which the electronic device is to perform the feature acquisition on the acquisition object.

20. The electronic device according to claim 19, wherein the processing circuit is configured to: determine, from the plurality of candidate positions, a plurality of actual positions at which the feature acquisition is to be performed on the acquisition object based on a feature acquisition capability of the electronic device, a use condition of the electronic device and characteristics of the electronic device.

21. The electronic device according to claim 16, wherein the acquisition configuration information comprises an acquisition parameter of the feature acquisition to be performed on the acquisition object, and the processing circuit is configured to control the electronic device to perform the feature acquisition on the acquisition parameter of the acquisition object.

22. The electronic device according to claim 21, wherein the acquisition parameter comprises one or more of: image, voice, depth, temperature, humidity, gas density, air velocity, radiation intensity, smell, pressure and smog.

23. The electronic device according to claim 16, wherein the processing circuit is configured to: receive sensor information from one or more sensors in the acquisition object.

24. The electronic device according to claim 16, wherein the electronic device comprises a smart drone.

25. A wireless communication system, comprising: a control apparatus, comprising a processing circuit configured to:
    determine a parameter set for characterizing image attributes of an acquisition object;
    determine, based on the parameter set, acquisition configuration information concerning a feature acquisition to be performed by an acquisition node on the acquisition object;
    transmit the acquisition configuration information to the acquisition node:
    receive, from the acquisition node, an acquisition result of a feature acquisition subsequently performed on the acquisition object by the acquisition node; and
    process the acquisition result from the acquisition node to output a final output result; and
    the acquisition node, the acquisition node comprising a processing circuit configured to:
    acquire the acquisition configuration information from the control apparatus;
    perform the feature acquisition on the acquisition object based on the acquisition configuration information; and
    transmit the acquisition result to the control apparatus,
    wherein the acquisition object is a tangible object.

26. The wireless communication system according to claim 25, wherein the wireless communication system further comprises a base for storing and charging the acquisition node.

27. A wireless communication method performed by an electronic device in a wireless communication system, comprising:
    determining a parameter set for characterizing image attributes of an acquisition object; determining, based on the parameter set, acquisition configuration information concerning a feature acquisition to be performed by an acquisition node on the acquisition object;
    transmitting the acquisition configuration information to the acquisition node;
    receiving, from the acquisition node, an acquisition result of a feature acquisition subsequently performed on the acquisition object by the acquisition node; and
    processing the acquisition result from the acquisition node to output a final output result, wherein the acquisition object is a tangible object.

28. A wireless communication method performed by an electronic device in a wireless communication system, comprising:
    acquiring, from a control device, acquisition configuration information determined based on a parameter set for characterizing image attributes of an acquisition object,
        wherein the acquisition configuration information comprises acquisition mode information concerning a feature acquisition to be performed on the acquisition object: and
        performing the feature acquisition on the acquisition object based on the acquisition configuration information,
    wherein the feature acquisition is performed in an acquisition mode included in the acquisition mode information,
    wherein the acquisition object is a tangible object, and
    wherein the acquisition mode information comprises one or more of: hover shooting, rotating shooting, vibrating shooting among a plurality of acquisition positions at a predetermined frequency, and a motion correlation relative to the acquisition object.

29. A non-transitory computer-readable storage medium, comprising computer-executable instructions, which causes a computer to execute the wireless communication method according to claim 27 when executed by the computer.

30. A non-transitory computer-readable storage medium, comprising computer-executable instructions, which causes a computer to execute the wireless communication method according to claim 28 when executed by the computer.

* * * * *